United States Patent [19]

Miyatake et al.

[11] Patent Number: 5,390,048
[45] Date of Patent: Feb. 14, 1995

[54] PROJECTION LENS ASSEMBLY AND PROJECTION DISPLAY APPARATUS

[75] Inventors: Yoshito Miyatake; Yuichi Kimura, both of Neyagawa; Sinya Sannohe, Osaka; Yoshimasa Fushimi, Hirakata, all of Japan

[73] Assignee: Matsushita Electric Industrial Co., Ltd., Osaka, Japan

[21] Appl. No.: 984,311

[22] Filed: Dec. 1, 1992

[30] Foreign Application Priority Data

Dec. 2, 1991 [JP] Japan .................................. 3-317692
Dec. 2, 1991 [JP] Japan .................................. 3-317693

[51] Int. Cl.⁶ .......................... G02B 9/12; G02B 9/34; G02B 13/22
[52] U.S. Cl. ..................... 359/650; 359/651; 359/663; 359/784; 359/781; 359/753
[58] Field of Search ............... 359/650, 651, 649, 663, 359/784, 781, 749–754

[56] References Cited

U.S. PATENT DOCUMENTS

| | | |
|---|---|---|
| 4,913,540 | 4/1990 | Minefuji . |
| 5,042,929 | 8/1991 | Tanaka et al. . |
| 5,200,861 | 4/1993 | Moskovich .......................... 359/752 |
| 5,218,480 | 6/1993 | Moskovich .......................... 359/752 |
| 5,278,698 | 1/1994 | Iizuka et al. ........................ 359/753 |

FOREIGN PATENT DOCUMENTS

| | | |
|---|---|---|
| 62-133424 | 6/1987 | Japan . |
| 63-114489 | 5/1988 | Japan . |
| 63-116123 | 5/1988 | Japan . |
| 1-188815 | 7/1989 | Japan . |
| 2-96709 | 4/1990 | Japan . |
| 3-122607 | 5/1991 | Japan . |
| 3-145613 | 6/1991 | Japan . |
| 4-13108 | 1/1992 | Japan . |
| 4-40406 | 2/1992 | Japan . |
| 4-335610 | 11/1992 | Japan . |

Primary Examiner—Jon W. Henry
Attorney, Agent, or Firm—Wenderoth, Lind & Ponack

[57] ABSTRACT

An optical system of a projection display apparatus includes a projection lens assembly having a first lens group having a negative power, a second lens group having a negative power and a third lens group having a positive power, all arranged in this order from a side of a screen. An air space is provided between the first and second lens groups and also between the second and third lens groups. Each air space is longer than the entire length of the second lens group as taken along the optical axis of the assembly. The projection display apparatus has a light source for radiating rays of light including three primary color components, a color separating optical system for separating the radiation into three primary color components, first to third light valves each operable to receive the respective primary color components from the color separating optical system and to form an optical image having an optical characteristic varying as a function of a video signal, and a color combining optical system for combining images of light emerging, respectively, from the light valves to provide a composite image. The projection lens assembly receives the image from the combining unit so as to project the optical images, formed on the respective light valves, onto a screen.

13 Claims, 34 Drawing Sheets

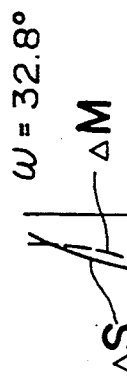  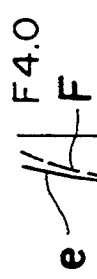 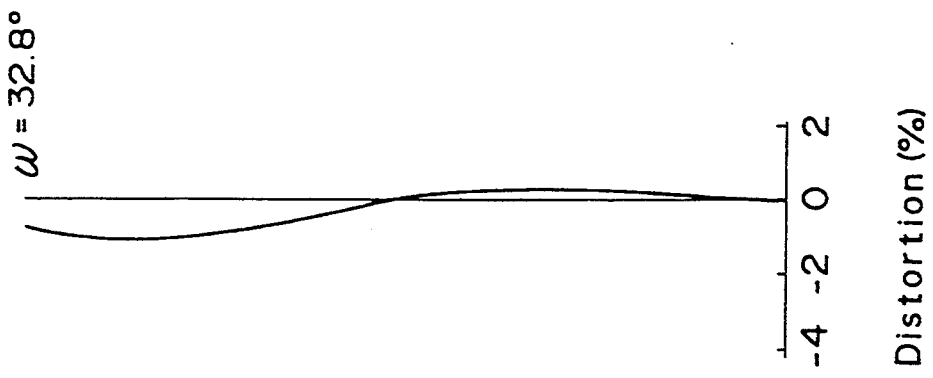

PROJECTION LENS ASSEMBLY AND PROJECTION DISPLAY APPARATUS

BACKGROUND OF THE INVENTION

1. Field of the Invention

The present invention relates to a projection lens assembly and a projection display apparatus for projecting optical images, formed on respective light valves, onto a screen on an enlarged scale.

2. Description of the Prior Art

Various methods have been practiced to project a large picture on a screen. One of them which appears to be relevant to the present invention includes forming an optical image on a light valve according to a video signal applied thereto, irradiating the optical image to produce images of light and passing the images of light through a projection lens assembly so as to be projected onto a screen on an enlarged scale. For the light valve, a recent trend is to employ a liquid crystal panel. Hence, the projection display system utilizing the liquid crystal panel as the light valve is well known in the art.

For example, Japanese Laid-open Patent Publication No. 62-133424, published Jun. 16, 1987, discloses a projection display apparatus of a separate type comprising a projector assembly and a screen. The projector assembly comprises three dichroic mirrors for separating rays of light of visible wavelength, radiated from a light source, into three primary color light components, respectively, three dichroic mirrors for combining the three color light components and three liquid crystal panels for displaying images in three colors, respectively. Also, U.S. Pat. No. 5,042,929 (corresponding to the Japanese Laid-open Patent Publication No. 2-250015, published in 1992) discloses a projection display apparatus of an integrated type comprising a cabinet having a back-lighting projection screen and a projector accommodated within the cabinet together with an optical system.

For reproducing projected images of high quality, the liquid crystal panel is known to comprise twisted nematic liquid crystal as a liquid crystal material and a plurality of pixels each constituted by a switching element in the form of a thin-film transistor. For driving the switching elements, an active matrix drive circuit is generally employed. Specifically, in a color picture reproduction, three liquid crystal panels are employed one for each of the three primary colors, i.e., red, green and blue.

The separate and integrated types of the prior art picture projection systems are shown in FIGS. 32 and 33, respectively, and reference will now be made thereto.

Referring first to FIG. 32 showing the separate type, rays of light emanating from a light source 11 pass through a color separating optical system, including dichroic mirrors 12 and 13 and a planar mirror 14, for separating the incident rays of light into color light components of three primary colors, that is, red, green and blue light components. These light components are, after having passed through associated field lenses 15, 16 and 17, projected onto the respective liquid crystal panels 18, 19 and 20. In response to a video signal applied to the liquid crystal panels 18, 19 and 20, the latter are driven to form respective optical images thereon each as a function of a change in light transmittance. Discrete images of light passing through the respective liquid crystal panels 18, 19 and 20 are then passed through a color combining optical system, including dichroic mirrors 21 and 22 and a planar mirror 23, to produce composite images of light which are subsequently projected through a projection lens assembly 24 onto a separate screen on an enlarged scale.

Referring now to FIG. 33 showing a projection optical system employed in the prior art integrated type, rays of light emanating from a light source 31 pass through a color separating optical system, including dichroic mirrors 32 and 33 and a planar mirror 34, for separating the incident rays of light into color light components of three primary colors, that is, red, green and blue light components. These light components are, after having passed through associated liquid crystal panels 35, 36 and 37, transmitted to respective projection lens assemblies 38, 39 and 40. When at this time the liquid crystal panels 35, 36 and 37 are driven in response to a picture signal applied thereto, respective optical images are formed on those liquid crystal panels 35, 36 and 37 each as a function of a change in light transmittance. Discrete images of light having passed through the respective liquid crystal panels 35, 36 and 37 are projected onto a common screen, shown by 42 in FIG. 34, by means of the projection lens assemblies 38, 39 and 40 so as to combine together to produce a composite color picture on the screen 42 on an enlarged scale.

According to the integrated type, in order for the discrete images of light having passed through the respective liquid crystal panels 35, 36 and 37 to be properly aligned with each other on the screen to produce the composite color picture, the projection lens assemblies 38, 39 and 40 have their respective optical axes lying parallel to each other while the liquid crystal panels 35 and 37 on respective sides of the liquid crystal panel 36 which occupies an intermediate position have their respective centers slightly offset from the associated optical axes of the projection lens assemblies 38 and 40.

The optical system shown in FIG. 33 is housed within a cabinet 41 of a generally rectangular box-like configuration as shown in FIG. 34 together with the screen 42. As shown in FIG. 34, the cabinet 41 has a portion of the front panel defined by the screen 42 and the projector 43 installed at a rear bottom of the interior of the cabinet 41. In order for the discrete images of light having passed through the respective projection lens assemblies 38, 39 and 40 to be projected onto the screen 42, two planar mirrors 44 and 45 are disposed within the cabinet 41 along an optical path from the projector 43 to the screen 42. The planar mirror 44 is positioned generally beneath the screen 42 so as to confront the projector 43 while the planar mirror 45 is positioned rearwardly of the screen 42 and generally above the projector 43, so that the discrete images of light travel in a generally zig-zag fashion from the projector 43 towards the screen 42.

The disposition of the component parts of the optical system shown in FIG. 34 is effective to minimize the distance over which the discrete images of light travel from the projector 43 to the screen 42, making it possible to minimize the size of the cabinet 41 and, hence, the projection display apparatus as a whole. As a matter of course, the screen 42 is of a sandwich structure including a Fresnel lens and a lenticular plate as is well known to those skilled in the art.

Any of the prior art projection display apparatuses shown in FIGS. 33 and 34 employs the three projection lens assemblies and, therefore, involves problems associated with color shift (the phenomenon in which the color tone of the projected color picture varies with a change in a viewing angle) and color non-uniformity. The color shift may be reduced to a certain extent by the use of the lenticular plate having a plurality of lenticular lenslets on its opposite surfaces, but a complete elimination of the color shift is impossible. On the other hand, the color non-uniformity may be compensated for to a certain extent by the use of a suitably designed electronic circuit, but a complete compensation is difficult to achieve.

Both the color shift and the color non-uniformity result from the use of the three projection lens assemblies and, in order to substantially eliminate those problems, a single projection lens assembly should be used together with the color combining optical system utilizing the dichroic mirrors for combining the discrete images of light to provide the composite color picture. In such case, the dichroic mirrors may be arranged so as to be either parallel to each other such as shown in FIG. 32 or in a generally X-shaped layout such as disclosed in Japanese Laid-open Patent Publication No. 63-116123 published in 1988.

In the parallel arrangement of the dichroic mirrors referred to above, the length of the irradiating optical path as measured from the light source to each of the liquid crystal panels is equal for each of the three primary colors, but in the X-shaped arrangement of the dichroic mirrors referred to above, the length of one of the irradiating optical paths associated with one of the three primary colors is greater than that of any one of the irradiating optical paths associated with the remaining two of the three primary colors. Since the presence of a difference in length of the irradiating optical paths for the three primary colors tends to result in a color non-uniformity, the prior art system shown in FIG. 32 appears to be more feasible.

Referring again to FIGS. 32 and 33, the prior art projection display apparatus of the separate type shown in FIG. 32 requires a space between the liquid crystal panels and the projector optics for the installation of the two dichroic mirrors and, therefore, the back focus $f_B$ (i.e., the distance from the back vertex, or the vertex of the rearmost lens element of the projection lens assembly, to the back focal point) must have a considerably great value. On the other hand, in order for the projection display apparatus of the integrated type shown in FIG. 33 to be made compact, the distance over which the rays of light are projected from the light source must be as small as possible and, to accomplish this, the projection lens assembly must have a smaller focal length f and a great angle of projection, that is, a wide-angle lens should be used for the projection display apparatus. (It is to be noted that the term "angle of projection" referred to above may be interchangeable with a popular photographic term "angle of view" used in connection with a camera lens, but differs from the latter in terms of the direction of travel of rays of light).

For the projection lens assemblies used in the separate type, a projection lens assembly having a focal length f of 90 mm and a back focus $f_B$ of 160 mm has been realized, having a back focus ratio ($f_B/f$) of 1.8. If an attempt is made to manufacture a compact projection display apparatus of an integrated type using the same liquid crystal panels and the same color combining optics as those used in the separate type, a rough calculation has indicated that the possible projection lens assembly should have a focal length f of 60 mm with the back focus ratio ($f_B/f$) of 2.5 or preferably of a value greater than 2.7.

A retrofocus lens assembly wherein front and rear lens groups having negative and positive powers, respectively, disposed along a common optical axis in this order from the screen is known as a lens assembly having a back focus $f_B$ greater than the focal length f. A lens assembly having a back focus ratio $f_B/f$ of 2.7 and yet having a reduced distortion cannot be found in either the field of camera lenses or in any other field although what appears to be an exception is a fish-eye lens assembly. While the fish-eye lens assembly having a back focus ratio $f_B/f$ greater than 3 is available, a considerable distortion occurs in this fish-eye lens assembly and, therefore, where a liquid crystal display device employed in the projection display apparatus employs matrix electrodes, the use of this fish-eye lens assembly would result in a pin-cushion distortion of the projected color picture.

A variety of projection lens assemblies for use in a projection display apparatus utilizing light valves have been suggested in, for example, U.S. Pat. No. 5,042,929, issued Aug. 27, 1991, and No. 4,913,540, issued Apr. 3, 1990, and Japanese Laid-open Patent Publication No. 3-145613, published Jun. 20, 1991. However, all of those disclosed lens assemblies have a smaller back focus ratio $f_B/f$ and do not satisfy a requirement of the back focus ratio $f_B/f$ of 2.7.

In general, an increase in back focus $f_B$ and a reduction in focal length f are incompatible to each other and, therefore, the projection lens assembly having even a back focus ratio $f_B/f$ of 2.7 has been considered difficult to realize.

SUMMARY OF THE INVENTION

The present invention is intended to provide an improved projection display apparatus that is compact and yet is capable of displaying large pictures substantially free of color shift and color non-uniformity. To accomplish this, the present invention also provides a wide-angle projection lens assembly of a sufficiently improved resolution which has a back focus ratio $f_B/f$ of 2.5 to 3 and which also has a minimized distortion.

More specifically, according to a preferred embodiment of the present invention, there is provided a projection lens assembly which comprises a first lens group having a negative power, a second lens group having a negative power and a third lens group having a positive power, all arranged in this order from a side of a screen. An air space is provided between the first and second lens groups and also between the second and third lens groups. These air spaces are each of a size greater than the entire length of the second lens group.

Preferably, the projection lens assembly satisfies the following conditions:

$$-2.0 < f_{G1}/f < -1.4 \qquad (1)$$

$$-15.0 < f_{G2}/f > -3.0 \qquad (2)$$

$$1.7 < (d_{G1} + d_{G2})/f < 2.2 \qquad (3)$$

wherein f represents the composite focal length of the entire system; $f_{G1}$ represents the composite focal length of the first lens group; $f_{G2}$ represents the composite focal length of the second lens group; $d_{G1}$ represents the length of an air space between the first and second lens groups; and $d_{G2}$ represents the length of air space between the second and third lens groups.

According to another preferred embodiment of the present invention, there is provided a projection lens assembly which comprises a first lens group having a negative power, a second lens group having a negative power, a third lens group having a positive power, and a fourth lens group having a positive power, all arranged in this order from a side of a screen, said fourth lens group being disposed in the vicinity of a point of focus formed by the first, second and third lens groups on one side against the screen. An air space is provided between the first and second lens groups and also between the second and third lens groups. Each of these air space is of a size greater than the entire length of the second lens group, principal rays of light which pass across a predetermined position of the fourth lens group within the space most remote from the screen being rendered parallel to an optical axis of the fourth lens group.

The projection lens assembly is preferred to satisfy the following conditions:

$$-2.6 < f_{G1}/f < -1.3 \quad (4)$$

$$-9.0 < f_{G2}/f < -1.7 \quad (5)$$

$$1.4 < (d_{G1}+d_{G2})/f < 2.3 \quad (6)$$

wherein f represents the composite focal length of the entire system; $f_{G1}$ represents the composite focal length of the first lens group; $f_{G2}$ represents the composite focal length of the second lens group; $d_{G1}$ represents the length of the air space between the first and second lens groups; and $d_{G2}$ represents the length of the air space between the second and third lens groups.

More preferably, the projection lens assembly of the type utilizing the first to fourth lens group further satisfy the following condition:

$$0.9 < f_{G4}/d_{G3} < 1.5 \quad (7)$$

wherein $f_{G4}$ represents the composite focal length of the fourth lens group, and $d_{G4}$ represents the length of the air space between the third and fourth lens groups.

In the practice of the present invention, a planar mirror may be disposed between the first and second lens groups or between the second and third lens groups.

According to a further preferred embodiment of the present invention, there is provided a projection lens assembly which comprises first, second and third auxiliary lenses all having an identical characteristic; a first dichroic mirror for combining rays of light emerging from the first auxiliary lens and rays of light emerging from the second auxiliary lens together; a color combining planar mirror adapted to receive rays of light emerging from the third auxiliary lens; a second dichroic mirror for combining rays of light emerging from the first dichroic mirror and rays of light emerging from the color combining plane mirror together; and a primary lens group for passing therethrough rays of light emerging from the second dichroic mirror, each of systems including the primary lens group and the first to third auxiliary lenses having a predetermined image forming characteristic. According to this embodiment, the primary lens group comprises the first lens group having a negative power, the second lens group having a negative power and the third lens group having a positive power, all arranged in this order from a side of a screen, an air space being provided between the first and second lens groups and also between the second and third lens groups.

Also, the present invention provides a projection display apparatus utilizing any one of the preferred embodiments of the projection lens assembly.

Specifically, in one embodiment of the projection display apparatus, the apparatus comprises a light source for radiating rays of light including three primary color components; means for separating the radiation from the light source into three primary color components; first to third light valves each operable to receive the respective primary color components from the color separating means to thereby form an optical image having an optical characteristic varying as a function of a video signal; means for combining images of light emerging respectively from the light valves to provide a composite image; and one of the projection lens assemblies disposed to receive the image from the combining means and for projecting the optical images, formed on the respective light valves, onto a screen.

Preferably, all of the optical elements forming the projection lens assembly according to the present invention are accommodated within a cabinet equipped with the light transmissive screen at a front thereof.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIGS. 4(a) to 4(d), 6(a) to 6(d), 8(a) to 8(d), 10(a) to 10(d), 12(a) to 12(d), 14(a) to 14(d), 16(a) to 16(d), 18(a) to 18(d), 20(a) to 20(d), 22(a) to 22(d), 24(a) to 24(d), and 26(a) to 26(d) are diagrams showing optical characteristics of the projection lens assemblies according to the present invention, respectively;

DETAILED DESCRIPTION OF THE PREFERRED EMBODIMENTS

Before describing various preferred embodiments of the present invention, the principle of a projection lens assembly according to the present invention will be discussed.

Figure 1:
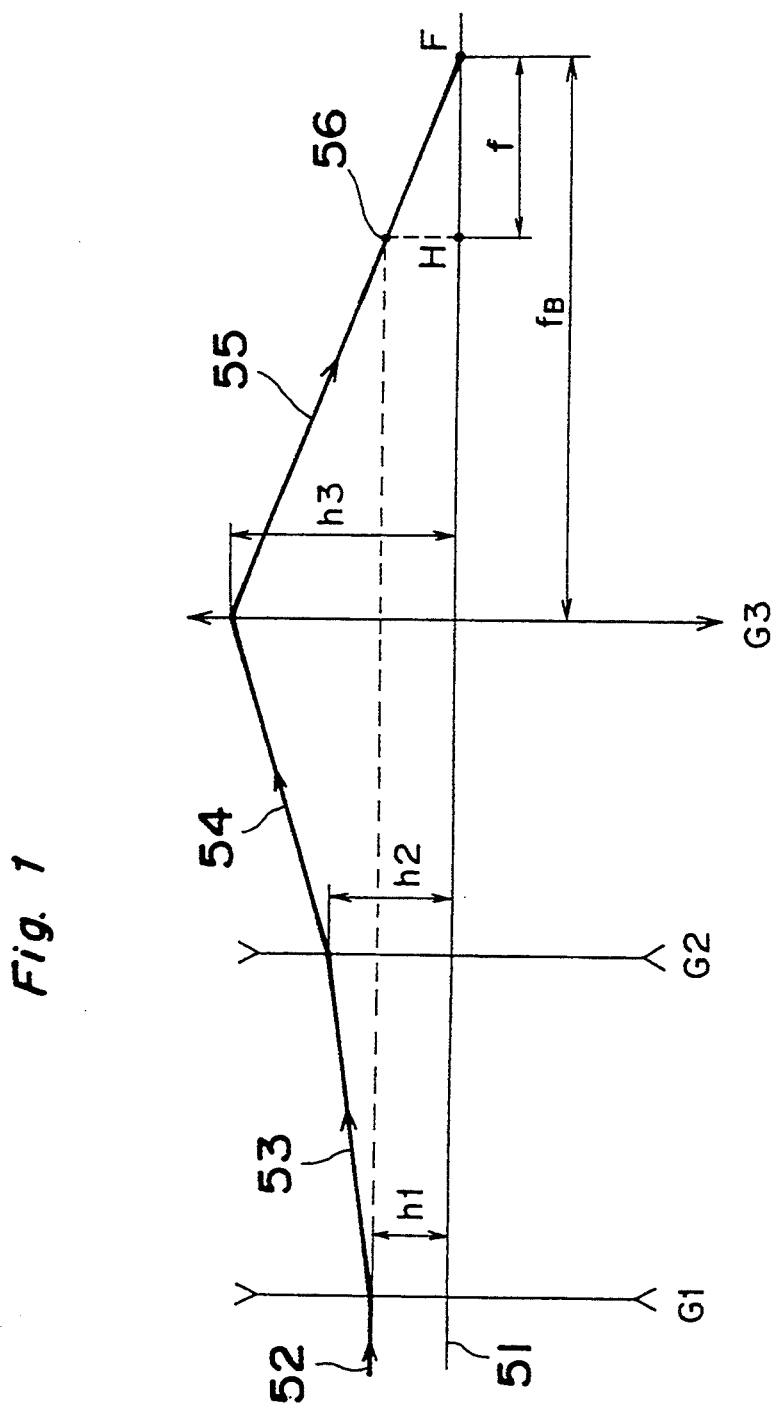
FIGS. 1 and 2 are schematic diagrams of two optical systems illustrative of the principle of a projection lens assembly according to the present invention.

Referring to FIG. 1, in the first place, it is assumed that the projection lens assembly includes first to third lens groups G1 to G3 and that, for the purpose of discussion, each lens group G1 to G3 is shown in the form of a thin lens element although each of the first to third lens groups G1 to G3 is in practice composed of one or a plurality of lens elements. In the example shown in FIG. 1, it is also assumed that a light ray 52 travelling from the side of a screen and along a path parallel to and spaced an off-axis distance h1 from an optical axis 51 of the projection lens assembly enters the projection lens assembly. The light ray 52 is then converted by the first lens group G1 having a negative power into a divergent ray 53 which subsequently enters the second lens group G2 at a position spaced an off-axis distance h2 greater than the off-axis distance h1. Since the second lens group G2 also has a negative power, the divergent ray emerging outwardly from the second lens group G2 is further diverged as indicated by 54. The divergent ray 54 emerging from the second lens group G2 enters the third lens group G3 at a position spaced an off-axis distance h3 greater than any one of the off-axis distances h1 and h2. Since the third lens group G3 has a positive power, the light ray 55 emerging outwardly from the third lens group G3 converges towards and intersects the optical axis 51 at a point of focus F. The point of intersection between the optical axis 51 and the imaginary line drawn radially inwardly from the point at which a straight extension of the light ray 52 intersects the convergent ray 55 is the principal point H. The distance from the principal point H to the point of focus F is the focal length f while the distance from the third lens group G3 to the point of focus F is the back focus $f_B$. The second lens group G2 having the negative power serves to increase the ratio h3/h1 and, therefore, the back focus ratio $f_B/f$ increases.

Preferably, the projection lens assembly satisfies the following conditions:

$$-2.0 < f_{G1}/f < -1.4 \tag{4}$$

$$-15.0 < f_{G2}/f < -3.0 \tag{5}$$

$$1.7 < (d_{G1} + d_{G2})/f < 2.2 \tag{6}$$

wherein f represents the composite focal length of the entire system; $f_{G1}$ represents the composite focal length of the first lens group; $f_{G2}$ represents the composite focal length of the second lens group; $d_{G1}$ represents the distance between the first and second lens groups; and $d_{G2}$ represents the distance between the second and third lens groups.

Since the off-axis distance h2 becomes greater than the off-axis distance h1 at the position of the second lens group G2, the light ray can be further diverged as it emerges outwardly from the second lens group G2 even though the second lens group G2 has a relatively low power. The lower the power of the second lens group G2, the smaller the aberrations attributable to the second lens group, and therefore, the various aberrations exhibited by the projection lens assembly as a whole can be satisfactorily corrected.

Figure 2:
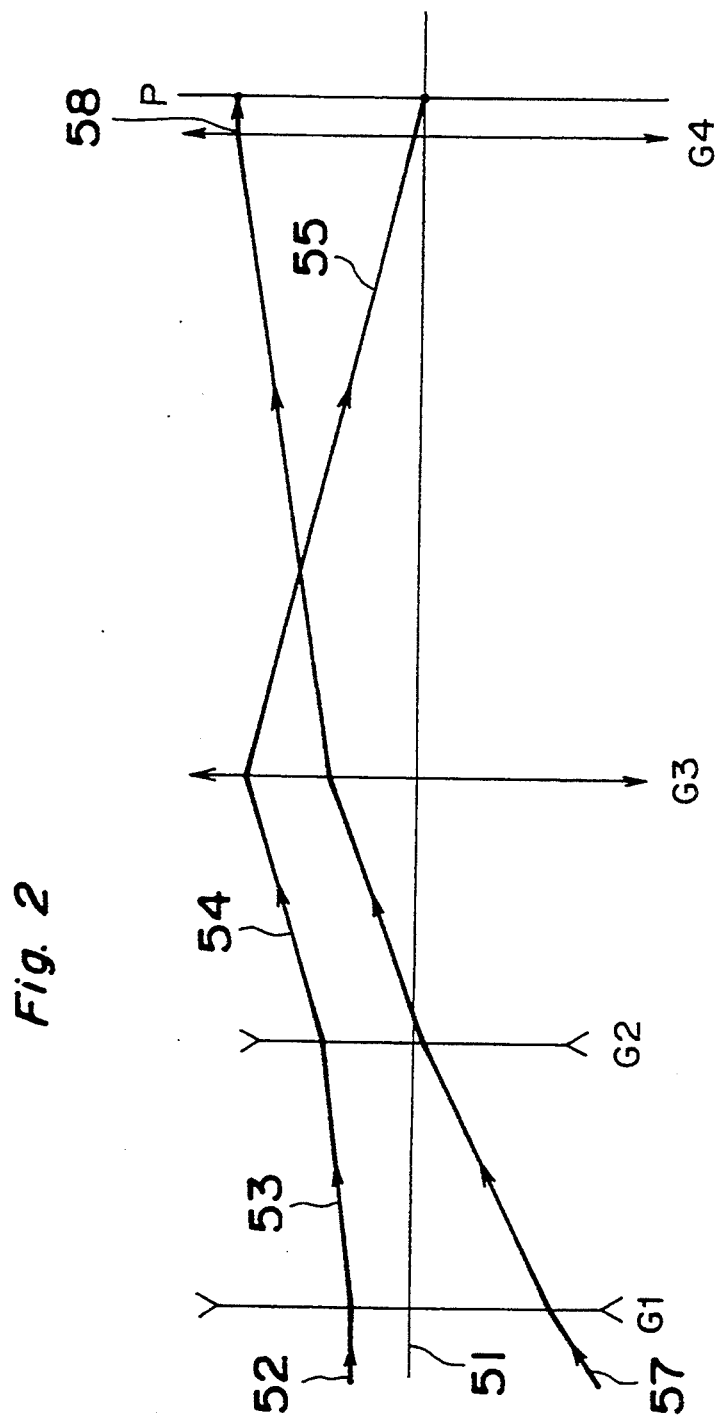

Referring now to FIG. 2, let it be assumed that an off-axis ray of light 57 travelling from the side of the screen is incident upon the projection lens assembly including first to fourth lens groups G1 to G4. Since the fourth lens group G4 has a positive power and is disposed adjacent a light valve P, a suitable selection of surface profiles of the fourth lens group G4 makes it possible to render the principal ray 58, emerging outwardly from the fourth lens group G4, to travel parallel to the optical axis 51 in an effective space between the fourth lens group G4 and the light valve P. Since as clearly shown in FIG. 2 the off-axis distance between the optical axis 51 and the convergent ray 55 at the fourth lens group G4 is relatively small and the off-axis distance between the optical axis 51 and the principal ray 58 is relatively great, the fourth lens group G4 can vary an off-axis aberration of the projection lens assembly without noticeably varying the spherical aberration of the projection optics. For this reason, the fourth lens group G4 is used to induce a positive distortion to compensate for a negative distortion occurring in the optical system from the first lens group G1 up to the third lens group G3, thereby minimizing the distortion of the projection lens assembly as a whole.

The projection lens assembly preferably satisfies the following conditions:

$$-2.6 < f_{G1}/f < -1.3 \tag{4}$$

$$-9.0 < f_{G2}/f < -1.7 \tag{5}$$

$$1.4 < (d_{G1} + d_{G2})/f < 2.3 \tag{6}$$

wherein f represents the composite focal length of the entire system; $f_{G1}$ represents the composite focal length of the first lens group; $f_{G2}$ represents the composite focal length of the second lens groups; $d_{G1}$ represents the length of the air space between the first and second lens groups; and $d_2$ represents the length of the air space between the second and third lens groups.

More preferably, the projection lens assembly of the type utilizing the first to fourth lens groups further satisfies the following condition:

$$0.9 < f_{G4}/d_{G3} < 1.5 \tag{7}$$

wherein $f_{G4}$ represents the composite focal length of the fourth lens group, and $d_{G4}$ represents the length of the air space between the third and fourth lens groups.

Conditions required for the projection lens assembly of the present invention to exhibit desirable characteristics will now be discussed. Any one of the formula (1) applicable to the optical system of FIG. 1 and the formula (4) applicable to the optical system of FIG. 2 must be satisfied to define the composite focal length $f_{G1}$ of the first lens group G1 within a predetermined range so that the desired back focus can be secured while aberrations in the projection optics as a whole are kept in equilibrium. If the ratio $f_{G1}/f$ is smaller than the lowermost limit, an attainment of the desired back focus would impose an increased load on the second lens group G2, making it difficult for the third lens group G3 to correct aberrations produced by the second lens group G2. On the other hand, if the ratio $f_{G1}/f$ is greater than the uppermost limit, an off-axis aberration produced by the first lens group G1 would no longer be corrected by the second and third lens groups G2 and G3 without difficulty even though the desired back focus can be attained.

Any one of the formula (2) applicable to the optical system of FIG. 1 and the formula (5) applicable to the optical system of FIG. 2 must be satisfied to define the composite focal length $f_{G2}$ of the second lens group G2 within a predetermined range together with the formula (1) or the formula (4), so that the desired back focus can be secured while aberrations in the projection lens assembly as a whole are kept in a balanced condition. If the ratio $f_{G2}/f$ is smaller than the lowermost limit, the desired back focus would no longer be attained without difficulty, but if the ratio $f_{G2}/f$ is greater than the uppermost limit, aberrations produced by the second lens group G2 would no longer be corrected by the third lens group G3 without difficulty even though the desired back focus can be attained.

Similarly, any one of the formula (3) applicable to the optical system of FIG. 1 and the formula (6) applicable to the optical system of FIG. 2 must be satisfied to avoid any possible vignetting and, at the same time, to secure the desired back focus. If the ratio $(d_{G1}+d_{G2})/f$ is smaller than the lowermost limit, no desired back focus would be attained without difficulty. If an attempt is made to increase the back focus unreasonably, the third lens group G3 would be excessively loaded to make it difficult to correct the aberrations of the projection optics as a whole in a well balanced fashion. On the other hand, if the ratio $(d_{G1}+d_{G2})/f$ is greater than the uppermost limit, the overall length of the resultant projection lens assembly would increase accompanied by a correspondingly increasing vignetting although the back focus can be advantageously increased. Although it may be contemplated to increase the effective diameter of the first lens group G1 in order to reduce the vignetting, this would result in a considerable increase in manufacturing cost. The use of the first lens group G1 having an increased effective diameter brings about an additional problem in that, particularly when planar mirrors are disposed in the optical path from the projection lens assembly to the screen, the cabinet must have an increased size in order to prevent the effective rays of light from being intercepted by the projection lens assembly.

The use of the third lens group G3 having an increased effective diameter is effective to reduce the vignetting, but would make it difficult to dispose two color-combining dichroic mirrors between the third lens group G3 and the light valve unless the back focus is further increased. As discussed above, if the back focus is increased unreasonably, the aberrations of the projection lens assembly as a whole can no longer be corrected in a well-balanced fashion.

If the formula (3) or (6) is satisfied, a space can be secured between the first and second lens groups G1 and G2 or between the second and third lens groups G2 and G3 for installation of the planar mirrors.

The formula (7) applicable to the optical system of FIG. 2 must be satisfied to render the principal ray passing through the light valve to be substantially parallel to the optical axis, that is, to enhance a telecentric characteristic. Since the light valve generally has its optical characteristic variable with the angle of incidence of rays of light, a varying image quality will occur in the picture eventually projected on the screen, should the principal rays within the effective area fail to enter the light valve at the same angle of incidence. In order to avoid this problem, the telecentric characteristic should be improved. If the ratio $f_{G4}/d_{G3}$ is smaller than the lowermost limit or greater than the uppermost limit, the telecentric characteristic will be insufficient in either case, resulting in the varying image quality occurring in the eventually projected picture.

Since in the projection display apparatus the rays of light emerging outwardly through three of the light valves are combined together by a color combining optical system to provide composite images of light and the composite image is projected onto the screen by means of a single projection lens assembly, not only does the color shift occur, but a color non-uniformity can also be minimized. Also, since the distance over which the image is projected is relatively small, and also since the size of the projection display apparatus with respect to the direction of projection of the image is reduced because of the installation of the planar mirrors within the projection optical system, the size of the projection system as a whole, generally represented by the size of the cabinet, can be reduced. The use of the two planar mirrors between the projection lens assembly and the screen to bend the path of travel of the image having passed through the projection lens assembly makes it possible to use a compact cabinet.

Figure 3:
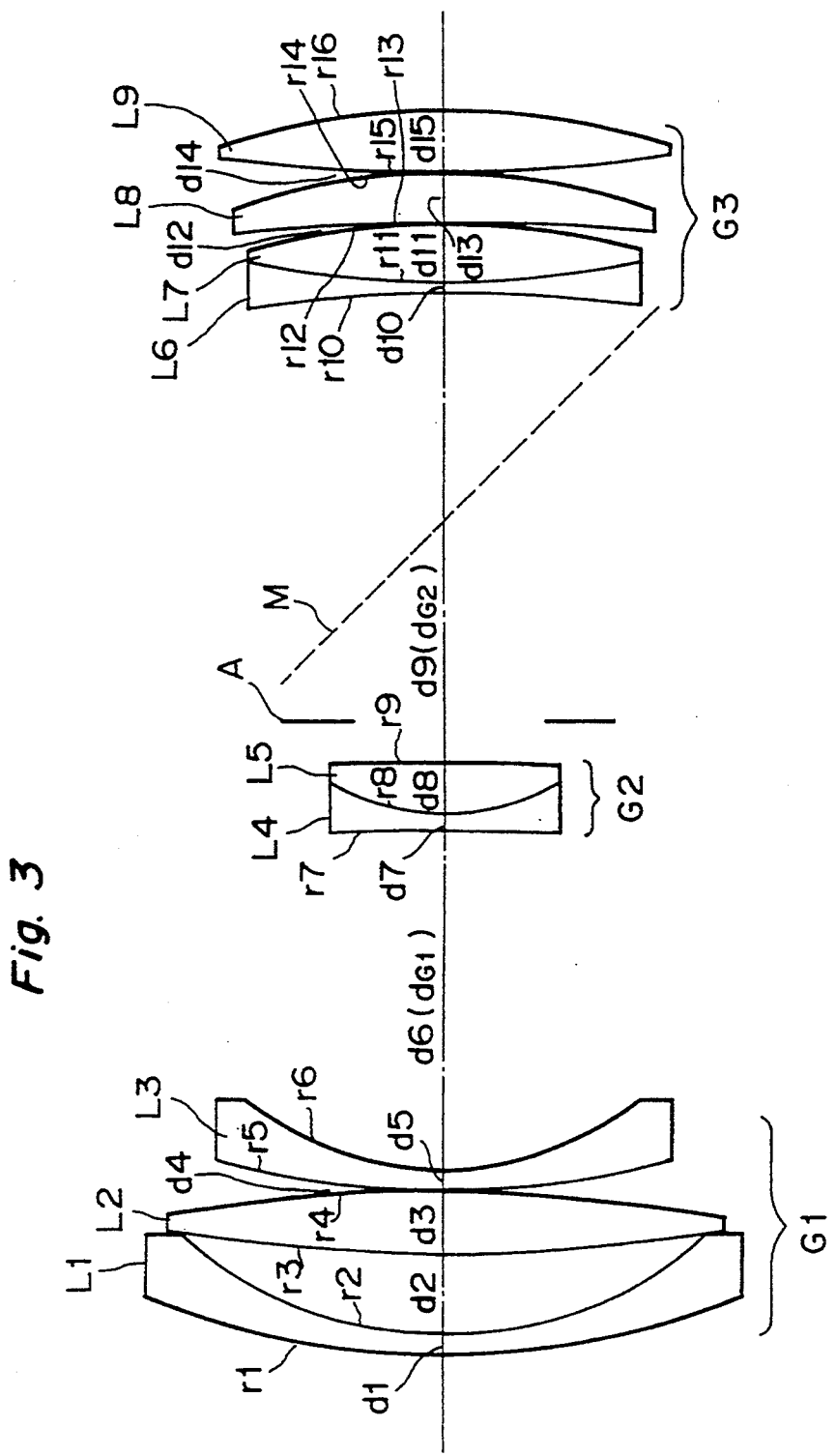
FIG. 3, 5, 7, 9, 11, 13, 15, 17, 19, 21, 23 and 25 are schematic diagrams of first to twelfth embodiments of optical systems including projection lens assemblies according to the present invention, respectively.
Figure 4:
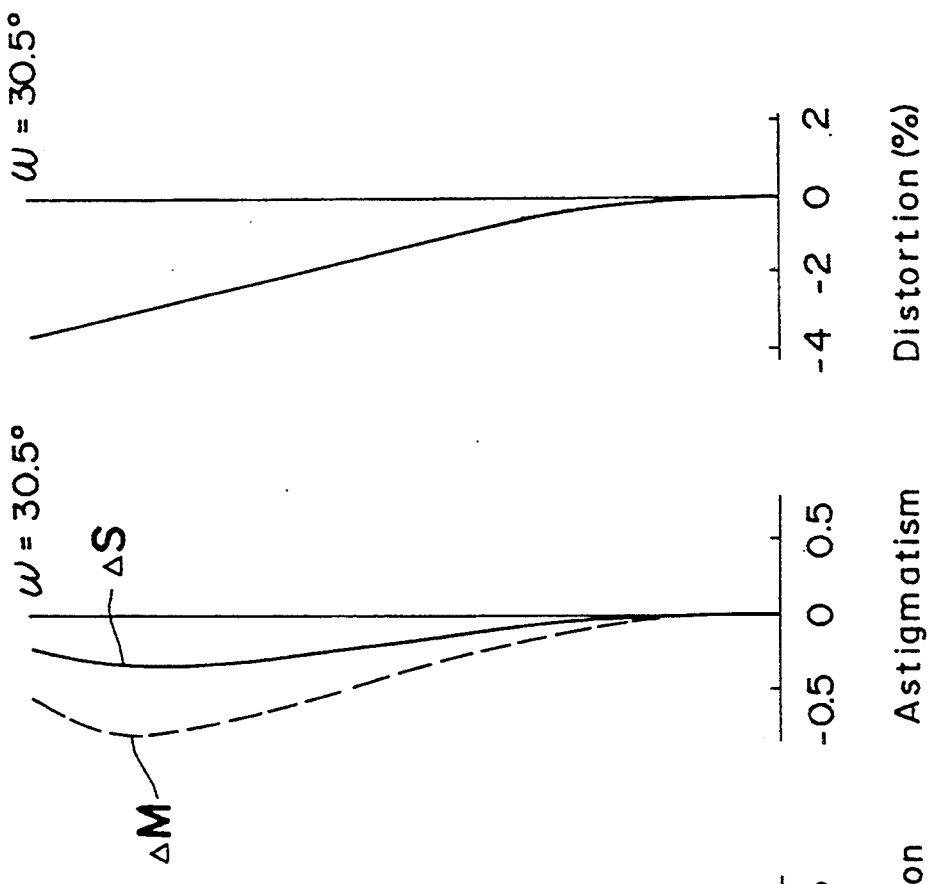
Figure 5:
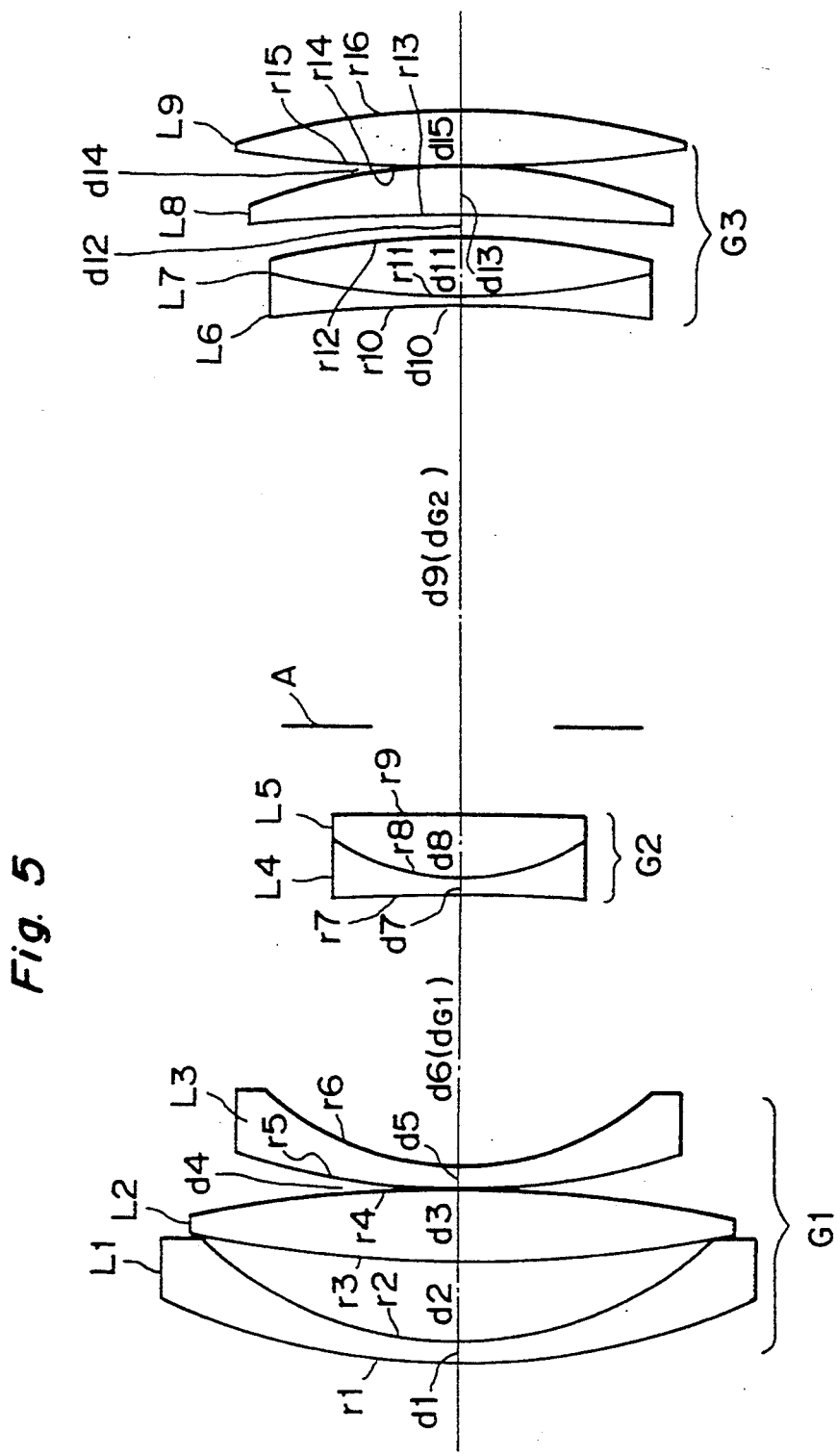
Figure 6:
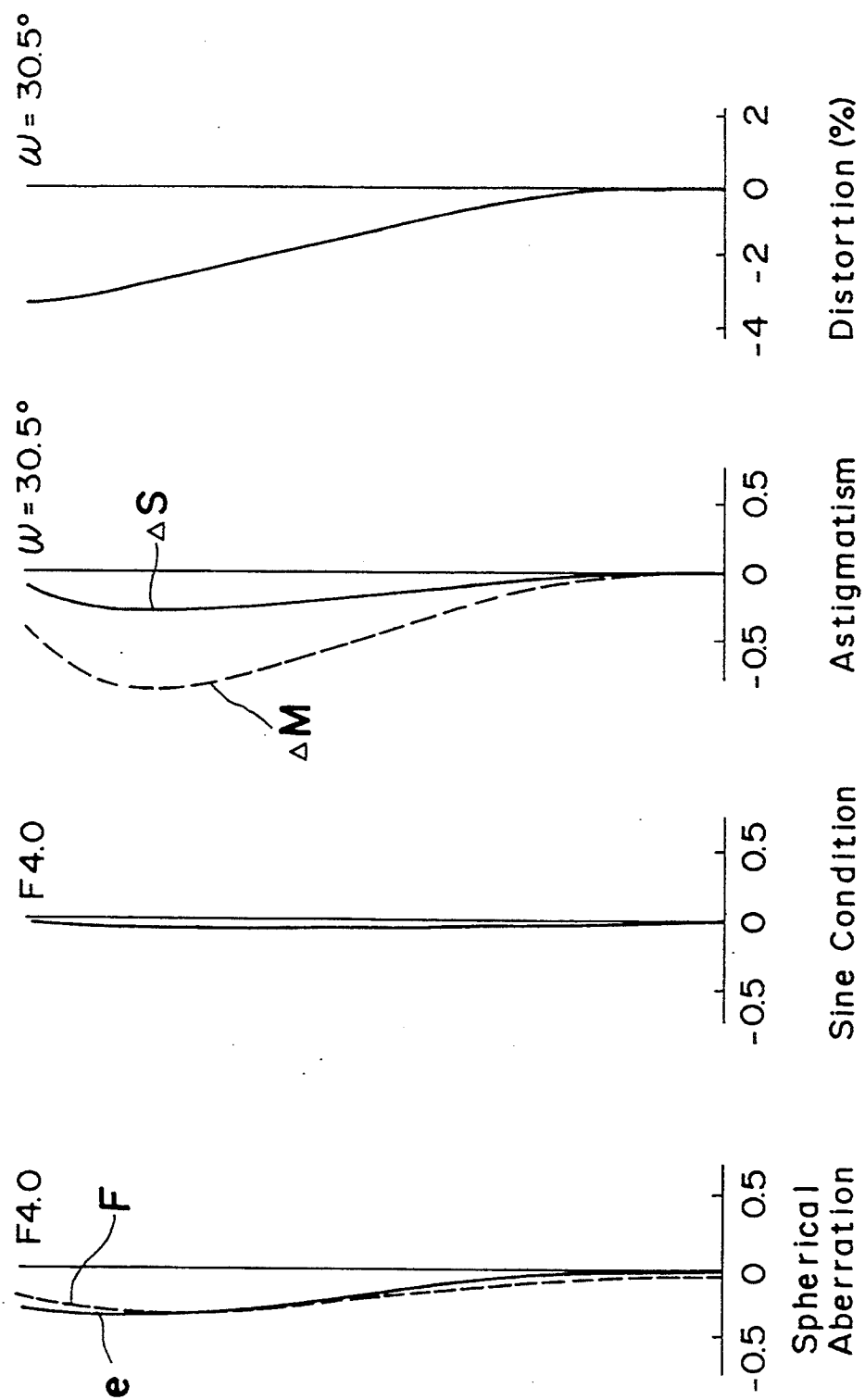
Figure 7:
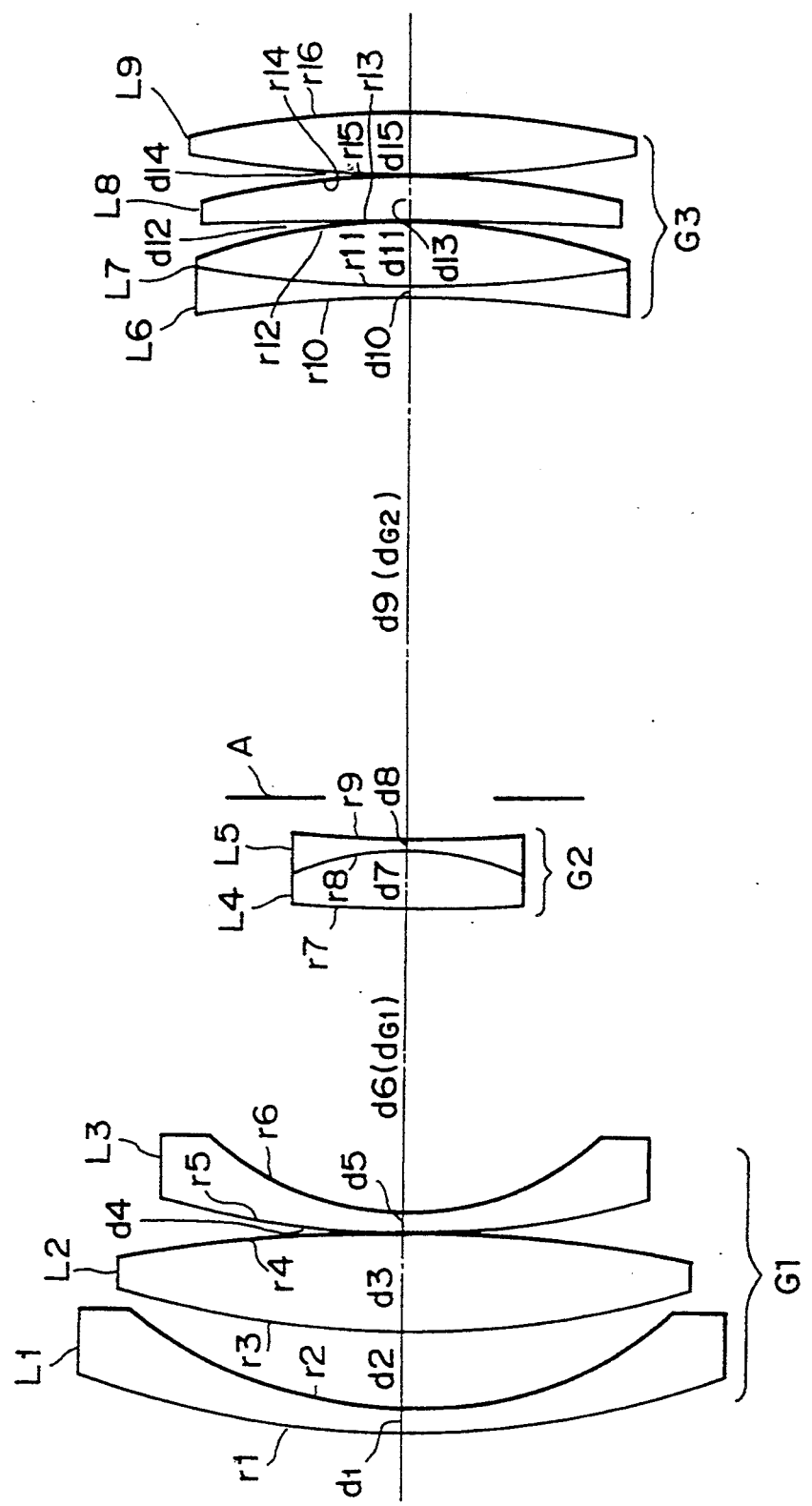
Figure 8:
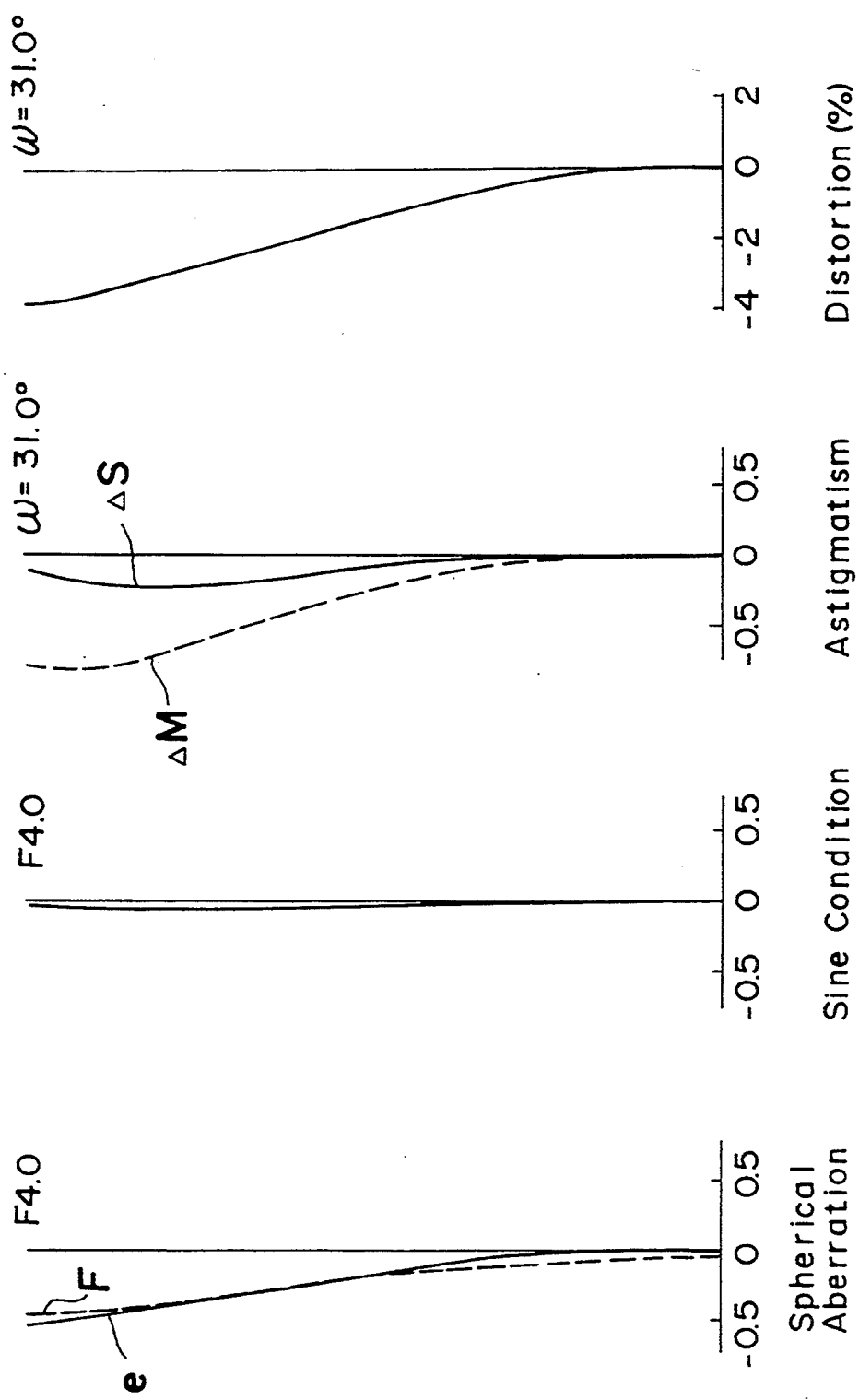
Figure 9:
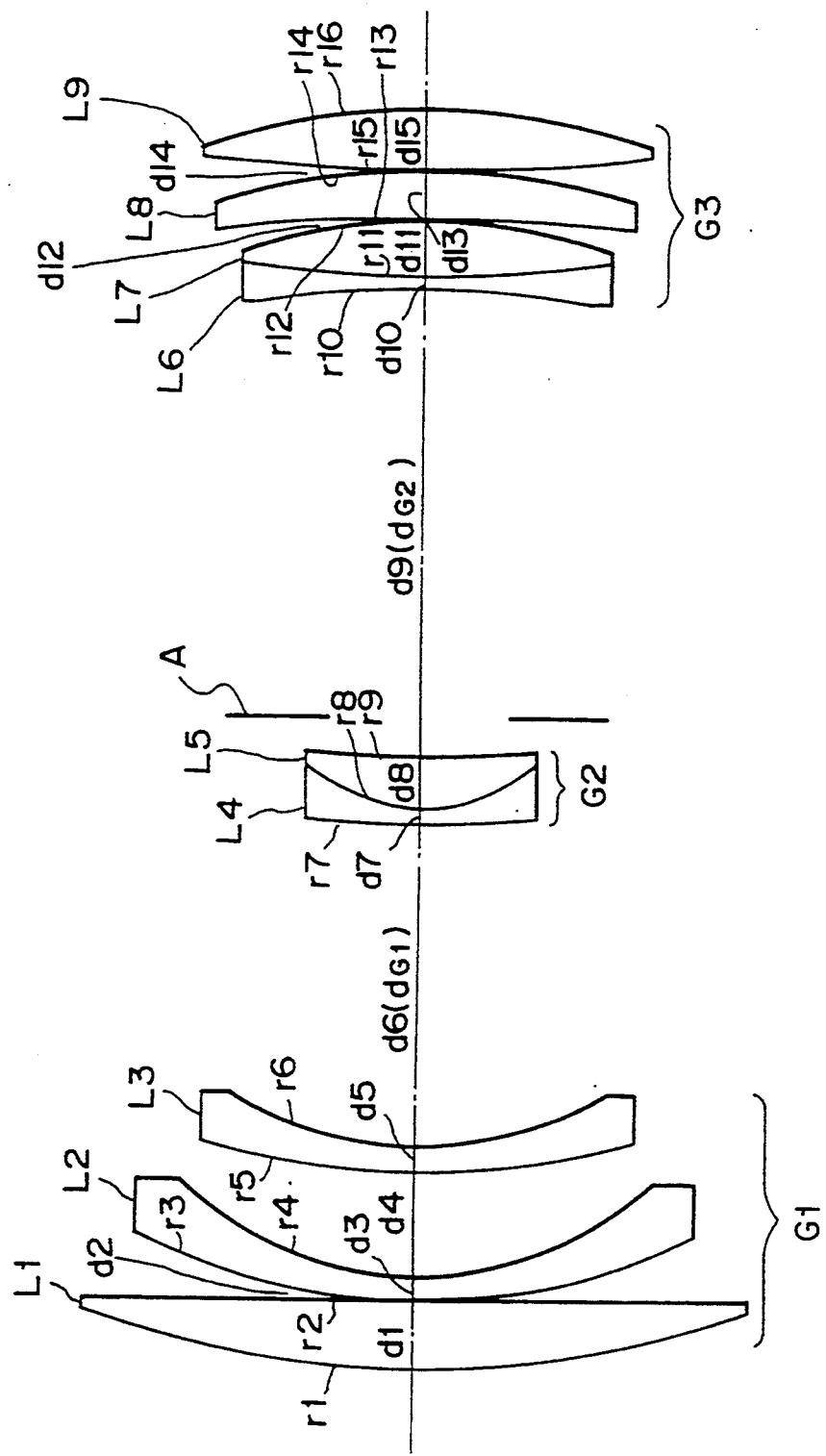
Figure 10:
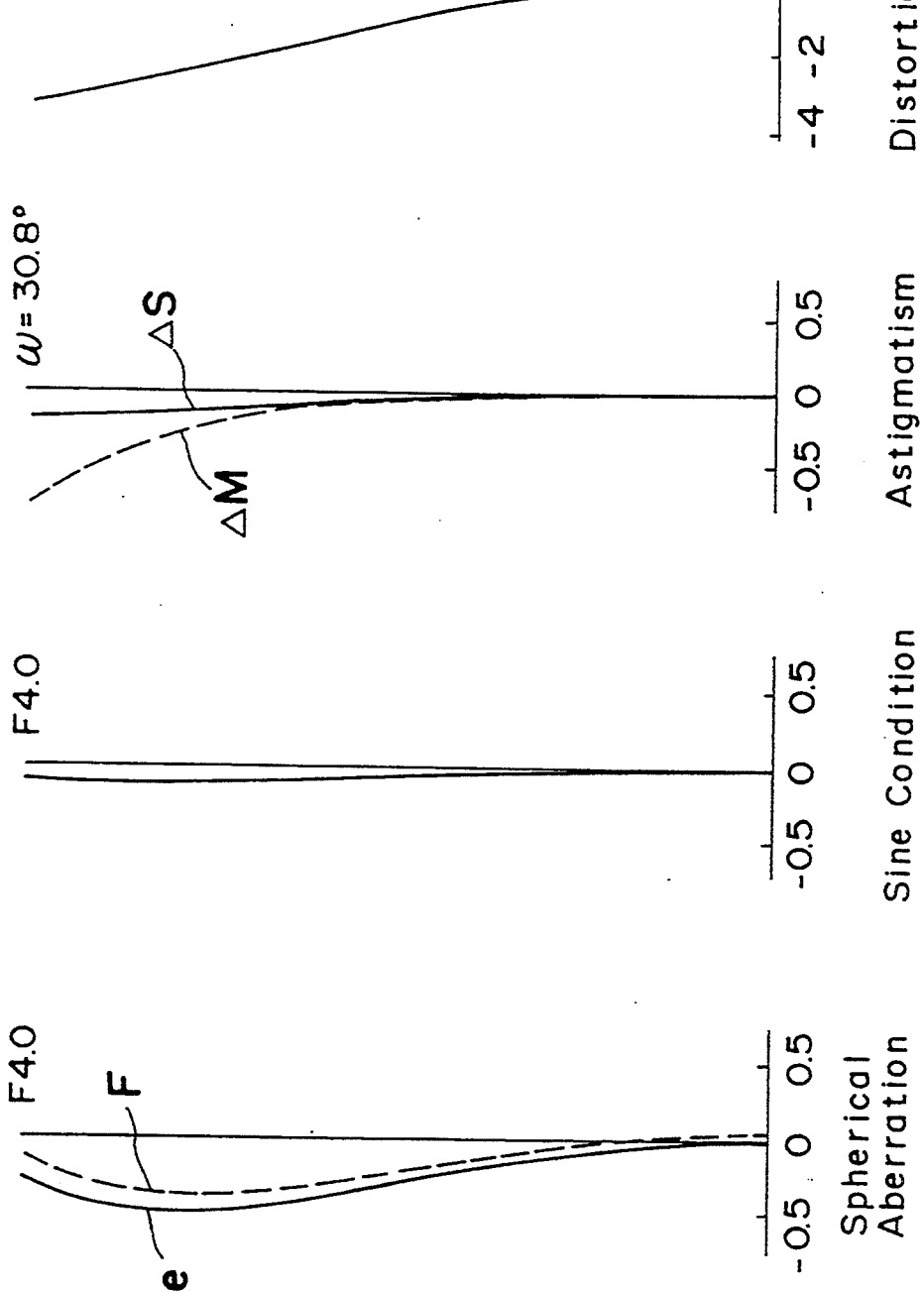
Figure 11:
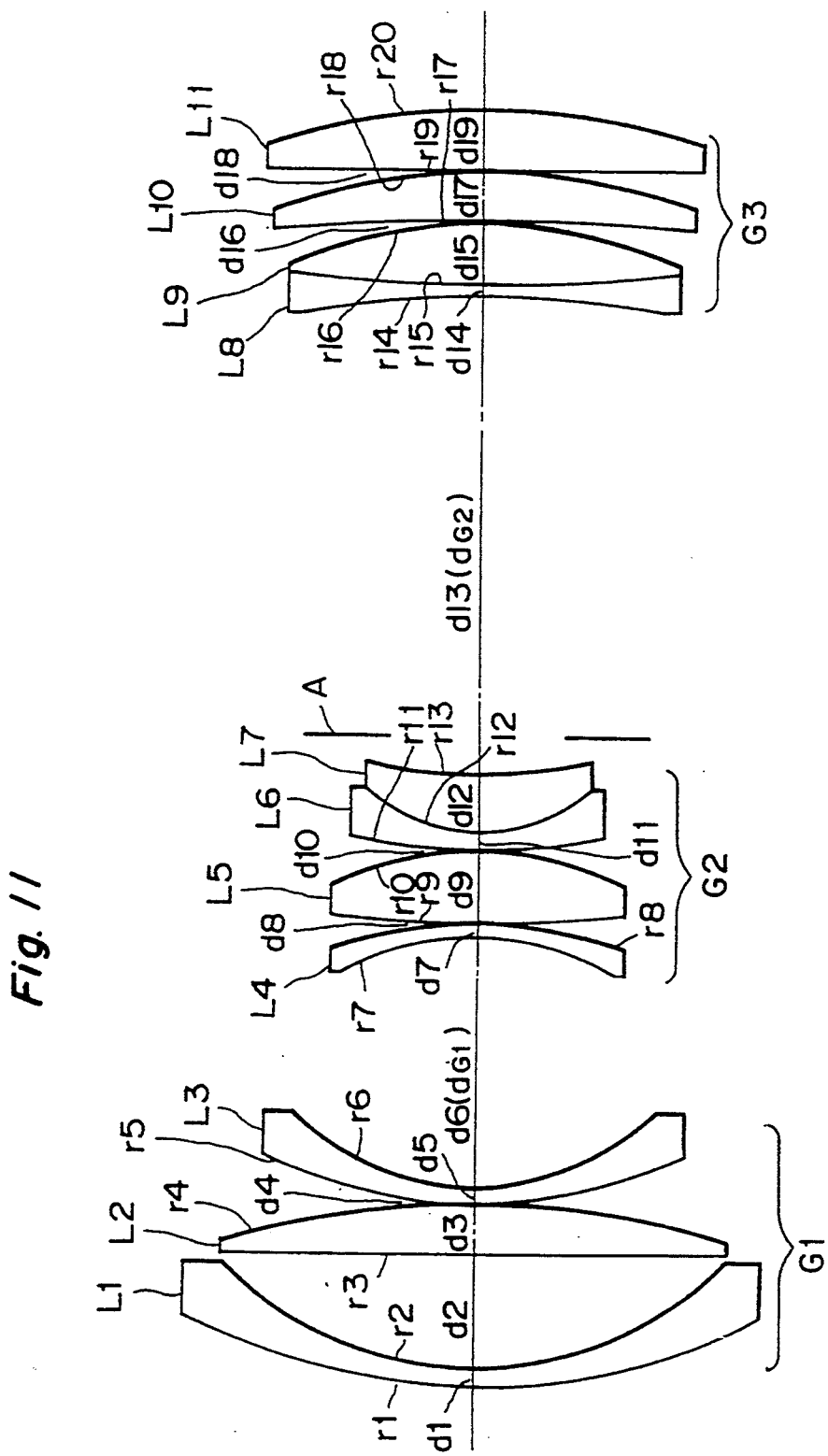
Figure 12:
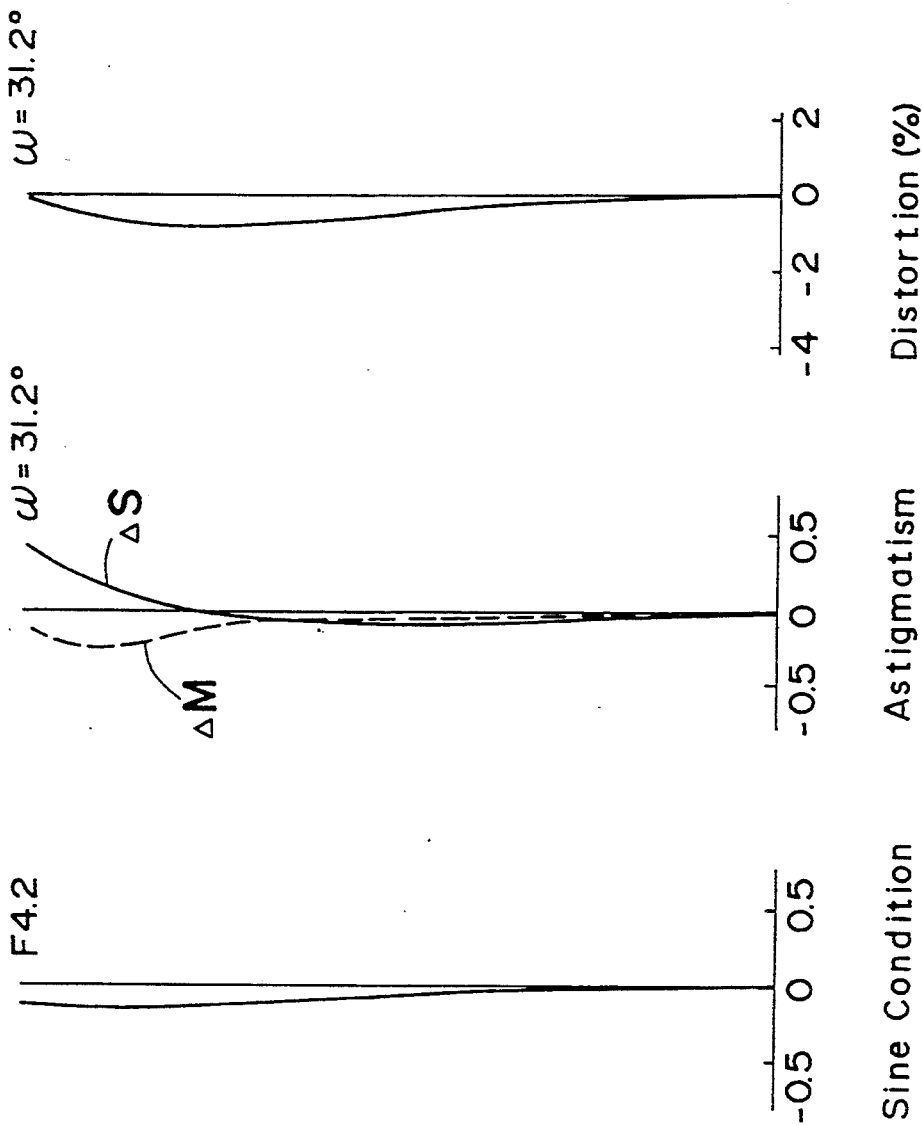
Figure 13:
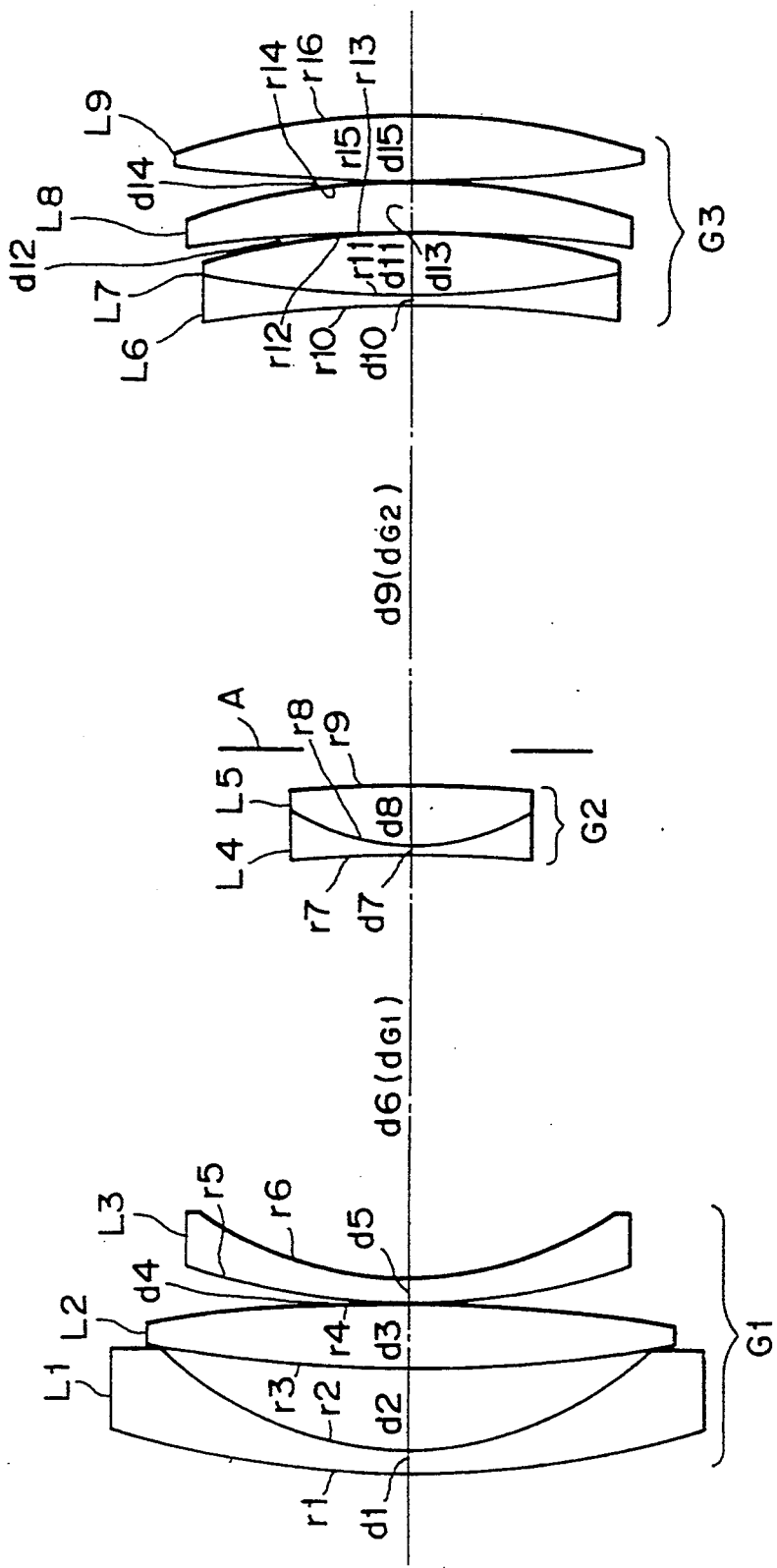

Referring now to FIG. 3, there is shown the projection optical system employed in a first preferred embodiment of the projection lens assembly according to the present invention. In this embodiment of FIG. 3, the projection lens assembly includes, in the order from the screen side to the side of a liquid crystal panel (from left to right as viewed therein), the first to third lens groups G1 to G3 with an aperture A disposed between the second and third lens groups G2 and G3. Reference character P represents one of glass substrates forming a liquid crystal panel that is positioned on the exit side through which the rays of light emerge outwardly from the liquid crystal panel. Specifications of those optical component parts are tabulated in Table 1.

Reference character Li (wherein i represents the numbering) represents an i-th lens element; reference character rj (wherein j represents the numbering) represents the radius of curvature of a j-th lens surface; reference character dj represents a distance through the air from the j-th lens surface to the next adjoining lens surface; and reference characters ni and $\nu i$ represent the index of refraction of the i-th lens at an e line and the Abbe number thereof, respectively. Reference characters $r_{P1}$ and $r_{P2}$ represent respective radii of curvature of opposite surfaces of the exit side glass substrate forming a part of the liquid crystal panel; $d_P$ represents the thickness of the exit side glass substrate of the liquid crystal panel; and reference characters $n_P$ and $\nu_P$ represent the index of refraction of the exit side glass substrate of the liquid crystal panel at the e line and the Abbe number thereof. Reference character $\omega$ represents the half angle of field on the side of the screen; reference character m represents the magnification factor; and reference character $f_B$ represents the distance from the rearmost surface of the rearmost lens element of the third lens group G3 to the point of focus (excluding the exit side glass substrate of the liquid crystal panel).

TABLE 1

| | | | | |
|---|---|---|---|---|
| f = 59.197 | F = 4.0 | $\omega$ = 30.5° | $f_B$ = 166.854 | m = −15.35 |

TABLE 1-continued

| | | | | |
|---|---|---|---|---|
| G1 | r1 = 107.033<br>r2 = 55.320<br>r3 = 234.256<br>r4 = −215.585<br>r5 = 114.654<br>r6 = 42.615 | d1 = 3.00<br>d2 = 11.00<br>d3 = 8.50<br>d4 = 0.20<br>d5 = 3.00<br>d6 = 46.18 | n1 = 1.59143<br>n2 = 1.62408<br>n3 = 1.66152 | ν1 = 61.0<br>ν2 = 36.1<br>ν3 = 50.6 |
| G2 | r7 = −281.756<br>r8 = 28.047<br>r9 = −681.778 | d7 = 2.00<br>d8 = 7.50<br>d9 = 64.17 | n4 = 1.69660<br>n5 = 1.62408 | ν4 = 53.1<br>ν5 = 36.1 |
| G3 | r10 = −211.007<br>r11 = 135.251<br>r12 = −105.699<br>r13 = −381.373<br>r14 = −88.427<br>r15 = 238.375<br>r16 = −99.555 | d10 = 2.00<br>d11 = 7.60<br>d12 = 0.30<br>d13 = 6.70<br>d14 = 0.20<br>d15 = 8.50 | n6 = 1.79192<br>n7 = 1.51825<br>n8 = 1.51825<br>n9 = 1.51825 | ν6 = 25.5<br>ν7 = 63.8<br>ν8 = 63.8<br>ν9 = 63.8 |
| P | $r_{P1}$ = ∞<br>$r_{P2}$ = ∞ | $d_P$ = 1.10 | $n_P$ = 1.51825 | $ν_P$ = 63.8 |

$f_{G1}/f = -1.812$   $f_{G2}/f = -4.095$   $f_{G3}/f = 1.470$
$d_{G1}/f = 0.780$   $d_{G2}/f = 1.084$   $f_P/f = 2.819$
$(d_{G1} + d_{G2})/f = 1.864$

The first lens group G1 includes first to third lenses L1, L2 and L3; the second lens group G2 includes fourth and fifth lenses L4 and L5; and the third lens group G3 includes sixth to ninth lenses L6, L7, L8 and L9. A relatively long spatial gap is provided between neighboring lens groups G1 and G2, G2 and G3. The first to ninth lenses L1 to L9 are arranged in the specified order from the side of the screen (i.e., left as viewed in FIG. 3) and respective types of these lenses L1 to L9 are as follows: First lens L1 ... Negative meniscus lens. This lens is disposed with its convex surface oriented towards the screen side.

Second lens L2 ... Biconvex lens.

Third lens L3 ... Negative meniscus lens disposed so as to have a convex surface oriented towards the screen side.

Fourth lens L4 ... Negative lens having opposite surfaces one of which has a small radius of curvature. This lens is so disposed as to have the surface having the small radius of curvature oriented towards the screen side.

Fifth lens L5 ... Positive lens having opposite surfaces one of which has a large radius of curvature. This lens is so disposed as to have the surface having the large radius of curvature oriented towards the screen side.

Sixth lens L6 ... Biconcave lens.

Seventh lens L7 ... Biconvex lens.

Eighth lens L8 ... Positive meniscus lens. This lens is disposed with its concave surface oriented towards the screen side.

Ninth lens L9 ... Biconvex lens.

The fourth and fifth lenses L4 and L5 are cemented together while the sixth and seventh lenses L6 and L7 are cemented together. The aperture A is positioned between the second and third lens groups G2 and G3, but adjacent the second lens group G2, for regulating both of the rays of light determinative of the F value and the off-axis rays. A planar mirror M for bending the path of travel of the rays of light can be disposed between the second and third lens groups G2 and G3 as shown by the phantom line in FIG. 3.

The retrofocus lens is known to be of a type wherein both of the distortion and the chromatic aberration of magnification cannot be corrected easily. In view of this, in the embodiment now under discussion, the first lens group G1 comprises the negative, positive and negative lenses arranged in this order so that the fourth surface r4 of the second lens L2 can produce a positive distortion that is utilized to compensate for a negative distortion produced by the negative lens, thereby minimizing the distortion of the projection lens assembly as a whole. The correction of the distortion is enhanced by the fact that the first lens group G1 and the second lens group G2 share the negative power with each other. Also, the use of the cemented lenses in each of the second and third lens groups G2 and G3 to adjust the balance between the surfaces to the two lenses to be cemented makes it possible to correct both the off-axis chromatic aberration and the chromatic aberration of magnification in a well balanced fashion.

Since the second lens group G2 compensates for most of the chromatic aberrations produced in the first lens group G1, the two lenses, the positive lens and the negative lens, are used to form the second lens group G2 with the Abbe number of the positive lens being smaller than that of the negative lens. In such case, if the two lenses are separated, one of the surfaces of the respective lenses which confront each other results in a total reflection, and the two lenses are therefore cemented together.

It is necessary for the third lens group G3 to correct various aberrations produced by the first and second lens groups G1 and G2, to thereby favorably improve the balance of the aberrations in the projection lens assembly as a whole. In addition, in order to increase the back focus, it is necessary for the principal point of the third lens group G3 to be positioned as close to the light valve as possible. For this purpose, both of the sixth and seventh lenses L6 and L7, cemented together, and the eighth lens L8 are employed in the form of a meniscus lens having a concave surface oriented towards the screen side while the ninth lens L9 is chosen to have an increased positive power. If the third lens group G3 is comprised of four lenses, the various aberrations occurring in the projection optics can advantageously corrected in a well-balanced fashion.

If the back focus ratio is desired to be increased such as in the present invention, the radius of curvature of the concave surface of the negative lens of the first lens group G1 decreases and, for this reason, the Petzval's sum would indicate an excessive correction. In view of this, it is recommended for the positive lens to have a low index of refraction and for the negative lens to have a high index of refraction. Where the positive lens having a low refractive index and the negative lens having a high refractive index are utilized, a relatively inexpensive glass material can be used for the positive lens in any one of the first and third lens groups G1 and G3, resulting advantageously in a reduction of the manufacturing cost.

Various aberrations occurring in the projection optics shown in Table 1 are shown in FIGS. 4(a) to 4(d). It is to be noted that, in these diagrams showing the various aberrations, aberrations resulting from the exit side glass substrate of the liquid crystal panel are included. As can be understood from FIG. 4, the aberrations are corrected in a well-balanced fashion. The half angle $\omega$ is a wide angle of 30.5° and the back focus ratio is as great as 2.8. Although the distortion is somewhat considerable, it may be practically negligible. Also, the F value is 4.0 which is sufficient for the projection display apparatus utilizing the liquid crystal panel. Since the vignetting factor at the maximum angle of field is 80% or higher, a sufficient amount of light can be secured from a peripheral region of the lens assembly.

The planar mirror M may be employed in the form of a surface mirror and, in such case, care must be taken concerning the flatness thereof. Needless to say, the projection lens assembly can be used without the planar mirror. Although the F value must be somewhat increased, the planar mirror may be disposed between the first and second lens groups G1 and G2.

Since the liquid crystal panel has an optical characteristic that varies with the angle of incidence of rays of light, it is necessary for the angle of field on the side of the liquid crystal panel to be reduced, that is, to improve the telecentric characteristic. In the first embodiment of the present invention, since the back focus is long, the telecentric characteristic is of a practically acceptable level.

The projection lens assemblies according to second to sixth embodiments of the present invention are shown in FIGS. 5, 7, 9, 11 and 13, respectively. Specifications of the optical component parts of the projection lens assemblies are tabulated in Tables 2, 3, 4, 5 and 6, respectively, while aberrations exhibited by the projection lens assemblies are shown in FIGS. 6, 8, 10, 12 and 14, respectively.

TABLE 2

| $f = 59.184$ | $F = 4.0$ | $\omega = 30.5°$ | $f_B = 166.883$ | $m = -15.35$ |
|---|---|---|---|---|
| G1 | r1 = 100.895 | d1 = 3.00 | n1 = 1.59143 | $\nu 1 = 61.0$ |
|  | r2 = 53.046 | d2 = 10.00 |  |  |
|  | r3 = 210.760 | d3 = 10.00 | n2 = 1.62408 | $\nu 2 = 36.1$ |
|  | r4 = −206.408 | d4 = 0.20 |  |  |
|  | r5 = 103.776 | d5 = 3.00 | n3 = 1.66152 | $\nu 3 = 50.6$ |
|  | r6 = 40.640 | d6 = 36.72 |  |  |
| G2 | r7 = −220.334 | d7 = 2.00 | n4 = 1.69660 | $\nu 4 = 53.1$ |
|  | r8 = 30.282 | d8 = 9.30 | n5 = 1.62408 | $\nu 5 = 36.1$ |
|  | r9 = −536.612 | d9 = 69.98 |  |  |
| G3 | r10 = −267.106 | d10 = 2.00 | n6 = 1.79192 | $\nu 6 = 25.5$ |
|  | r11 = 127.437 | d11 = 7.60 | n7 = 1.51825 | $\nu 7 = 63.8$ |
|  | r12 = −118.744 | d12 = 3.07 |  |  |
|  | r13 = −417.756 | d13 = 6.70 | n8 = 1.51825 | $\nu 8 = 63.8$ |
|  | r14 = −86.225 | d14 = 0.20 |  |  |
|  | r15 = 215.460 | d15 = 7.50 | n9 = 1.51825 | $\nu 9 = 63.8$ |
|  | r16 = −115.272 |  |  |  |
| P | $r_{P1} = \infty$ | $d_P = 1.10$ | $n_P = 1.51825$ | $\nu_P = 63.8$ |
|  | $r_{P2} = \infty$ |  |  |  |

$f_{G1}/f = -1.857$  $f_{G2}/f = -3.875$  $f_{G3}/f = 1.488$
$d_{G1}/f = 0.620$  $d_{G2}/f = 1.182$  $f_B/f = 2.820$
$(d_{G1} + d_{G2})/f = 1.803$

TABLE 3

| $f = 59.412$ | $F = 4.0$ | $\omega = 31.0°$ | $f_B = 166.842$ | $m = -15.35$ |
|---|---|---|---|---|
| G1 | r1 = 140.687 | d1 = 3.00 | n1 = 1.59143 | $\nu 1 = 61.0$ |
|  | r2 = 60.665 | d2 = 11.00 |  |  |
|  | r3 = 154.254 | d3 = 13.00 | n2 = 1.62408 | $\nu 2 = 36.1$ |
|  | r4 = −226.900 | d4 = 0.20 |  |  |
|  | r5 = 125.469 | d5 = 3.00 | n3 = 1.66152 | $\nu 3 = 50.6$ |
|  | r6 = 41.048 | d6 = 42.37 |  |  |
| G2 | r7 = 363.713 | d7 = 7.50 | n4 = 1.62408 | $\nu 4 = 36.1$ |
|  | r8 = −43.430 | d8 = 2.00 | n5 = 1.69660 | $\nu 5 = 53.1$ |
|  | r9 = 209.503 | d9 = 74.79 |  |  |
| G3 | r10 = −216.060 | d10 = 2.00 | n6 = 1.79192 | $\nu 6 = 25.5$ |
|  | r11 = 167.098 | d11 = 8.50 | n7 = 1.51825 | $\nu 7 = 63.8$ |
|  | r12 = −93.405 | d12 = 0.30 |  |  |
|  | r13 = −795.107 | d13 = 6.70 | n8 = 1.51825 | $\nu 8 = 63.8$ |
|  | r14 = −113.778 | d14 = 0.20 |  |  |
|  | r15 = 186.504 | d15 = 8.50 | n9 = 1.51825 | $\nu 9 = 63.8$ |
|  | r16 = −135.537 |  |  |  |
| P | $r_{P1} = \infty$ | $d_P = 1.10$ | $n_P = 1.51825$ | $\nu_P = 63.8$ |
|  | $r_{P2} = \infty$ |  |  |  |

$f_{G1}/f = -1.755$  $f_{G2}/f = -5.197$  $f_{G3}/f = 1.512$
$d_{G1}/f = 0.713$  $d_{G2}/f = 1.259$  $f_B/f = 2.808$
$(d_{G1} + d_{G2})/f = 1.972$

TABLE 4

| f = 59.661 | F = 4.0 | ω = 30.8° | $f_B$ = 166.431 | m = −15.35 |
|---|---|---|---|---|

| | | | | |
|---|---|---|---|---|
| G1 | r1 = 145.383 | d1 = 9.00 | n1 = 1.51825 | ν1 = 63.8 |
| | r2 = 1845.534 | d2 = 0.20 | | |
| | r3 = 93.695 | d3 = 3.00 | n2 = 1.59143 | ν2 = 61.0 |
| | r4 = 47.121 | d4 = 14.70 | | |
| | r5 = 113.826 | d5 = 3.00 | n3 = 1.69660 | ν3 = 53.1 |
| | r6 = 47.820 | d6 = 45.00 | | |
| G2 | r7 = 256.091 | d7 = 2.00 | n4 = 1.69660 | ν4 = 53.1 |
| | r8 = 23.674 | d8 = 7.50 | n5 = 1.62408 | ν5 = 36.1 |
| | r9 = 259.917 | d9 = 64.17 | | |
| G3 | r10 = −159.699 | d10 = 2.00 | n6 = 1.79192 | ν6 = 25.5 |
| | r11 = 165.767 | d11 = 7.60 | n7 = 1.51825 | ν7 = 63.8 |
| | r12 = −75.809 | d12 = 0.30 | | |
| | r13 = −285.460 | d13 = 6.70 | n8 = 1.48915 | ν8 = 70.3 |
| | r14 = −98.567 | d14 = 0.20 | | |
| | r15 = 281.125 | d15 = 8.50 | n9 = 1.51825 | ν9 = 63.8 |
| | r16 = −91.824 | | | |
| P | $r_{P1}$ = ∞ | $d_P$ = 3.30 | $n_P$ = 1.51825 | $ν_P$ = 63.8 |
| | $r_{P2}$ = ∞ | | | |

$f_{G1}/f = -1.533$   $f_{G2}/f = -6.140$   $f_{G3}/f = 1.456$
$d_{G1}/f = 0.754$   $d_{G2}/f = 1.075$   $f_B/f = 2.790$
$(d_{G1} + d_{G2})/f = 1.830$

TABLE 5

| f = 58.862 | F = 4.2 | ω = 31.2° | $f_B$ = 169.492 | m = −15.37 |
|---|---|---|---|---|

| | | | | |
|---|---|---|---|---|
| G1 | r1 = 93.256 | d1 = 2.00 | n1 = 1.70557 | ν1 = 40.9 |
| | r2 = 49.921 | d2 = 16.50 | | |
| | r3 = −1601.424 | d3 = 6.80 | n2 = 1.76168 | ν2 = 27.3 |
| | r4 = −129.048 | d4 = 0.30 | | |
| | r5 = 71.798 | d5 = 2.00 | n3 = 1.74690 | ν3 = 49.0 |
| | r6 = 36.504 | d6 = 35.69 | | |
| G2 | r7 = −38.887 | d7 = 2.00 | n4 = 1.74690 | ν4 = 51.9 |
| | r8 = −63.978 | d8 = 0.30 | n5 = 1.51977 | ν5 = 51.9 |
| | r9 = 334.693 | d9 = 9.75 | | |
| | r10 = −46.609 | d10 = 0.54 | n6 = 1.69660 | ν6 = 53.1 |
| | r11 = 107.775 | d11 = 2.00 | n7 = 1.60718 | ν7 = 37.8 |
| | r12 = 22.829 | d12 = 8.00 | | |
| | r13 = 57.573 | d13 = 68.35 | n8 = 1.79192 | ν8 = 25.5 |
| G3 | r14 = −147.456 | d14 = 2.00 | | |
| | r15 = 335.277 | d15 = 8.50 | n9 = 1.51825 | ν9 = 63.8 |
| | r16 = −66.175 | d16 = 0.32 | | |
| | r17 = −301.023 | d17 = 7.00 | n10 = 1.48915 | ν8 = 70.3 |
| | r18 = −91.040 | d18 = 0.21 | | |
| | r19 = 2681.391 | d19 = 8.50 | n11 = 1.48915 | ν9 = 70.3 |
| | r20 = −102.594 | | | |
| P | $r_{P1}$ = ∞ | $d_P$ = 3.30 | $n_P$ = 1.51825 | $ν_P$ = 63.8 |
| | $r_{P2}$ = ∞ | | | |

$f_{G1}/f = -1.494$   $f_{G2}/f = -10.440$   $f_{G3}/f = 1.570$
$d_{G1}/f = 0.606$   $d_{G2}/f = 1.161$   $f_B/f = 2.879$
$(d_{G1} + d_{G2})/f = 1.768$

TABLE 6

| f = 58.871 | F = 4.0 | ω = 31.2° | $f_B$ = 166.796 | m = −15.38 |
|---|---|---|---|---|

| | | | | |
|---|---|---|---|---|
| G1 | r1 = 140.785 | d1 = 3.00 | n1 = 1.59143 | ν1 = 61.0 |
| | r2 = 44.731* | d2 = 11.00 | | |
| | r3 = 208.670 | d3 = 8.50 | n2 = 1.62408 | ν2 = 36.1 |
| | r4 = −247.300 | d4 = 0.20 | | |
| | r5 = 89.943 | d5 = 3.00 | n3 = 1.66152 | ν3 = 50.6 |
| | r6 = 47.174 | d6 = 56.86 | | |
| G2 | r7 = −626.202 | d7 = 2.00 | n4 = 1.69660 | ν4 = 53.1 |
| | r8 = 33.179 | d8 = 7.50 | n5 = 1.62408 | ν5 = 36.1 |
| | r9 = −350.264 | d9 = 64.79 | | |
| G3 | r10 = −191.008 | d10 = 2.00 | n6 = 1.79192 | ν6 = 25.5 |
| | r11 = 143.188 | d11 = 7.60 | n7 = 1.51825 | ν7 = 63.8 |
| | r12 = −104.504 | d12 = 0.30 | | |
| | r13 = −319.534 | d13 = 6.70 | n8 = 1.51825 | ν8 = 63.8 |
| | r14 = −91.674 | d14 = 0.20 | | |
| | r15 = 249.803 | d15 = 8.50 | n9 = 1.51825 | ν9 = 63.8 |
| | r16 = −104.015 | | | |
| P | $r_{P1}$ = ∞ | $d_P$ = 1.10 | $n_P$ = 1.51825 | $ν_P$ = 63.8 |
| | $r_{P2}$ = ∞ | | | |

Aspherical Coefficient:
$κ2 = -3.77837 \times 10^{-1}$   $d2 = -2.34851 \times 10^{-7}$   $e2 = 4.67470 \times 10^{-12}$
$f2 = 2.11586 \times 10^{-16}$   $g2 = 2.25164 \times 10^{-17}$ TABLE 6-continued

| | | |
|---|---|---|
| $f_{G1}/f = -1.671$ | $f_{G2}/f = -11.406$ | $f_{G3}/f = 1.612$ |
| $d_{G1}/f = 0.966$ | $d_{G2}/f = 1.101$ | $f_B/f = 2.833$ |
| $(d_{G1} + d_{G2})/f = 2.066$ | | |

The second embodiment of the projection lens assembly according to the present invention is similar in structure to that according to the first embodiment thereof. The the third embodiment of the present invention is similar to the first embodiment thereof except with respect to the order of positive and negative lenses which constitute the second lens group G2. The fourth embodiment of the present invention is similar to the first embodiment except with respect to the order of positive, negative and negative lenses which constitute the first lens group G1.

The fifth embodiment of the present invention is similar to the first embodiment thereof except that the second lens group G2 in the fifth embodiment is constituted by four lenses. Specifically, the tenth surface r10 of the fifth lens L5 is used to produce a positive distortion which is used to reduce a negative distortion produced by a negative lens in the first lens group G1, thereby minimizing the maximum distortion produced in the projection optical system as a whole.

The sixth embodiment of the present invention is similar to the first embodiment except that the first lens L1 used in the first lens group G1 in the sixth embodiment has the second surface r2 which is an aspherical surface of a profile represented by the following equation:

$$S = \frac{h^2/r_j}{1 + \sqrt{1 - (1 + \kappa_j)(h/r_j)^2}} + d_j h^4 + e_j h^6 + f_j h^8 + g_j h^{10} \quad (8)$$

wherein h represents the off-axis distance radially from the optical axis, S represents the quantity of sag, $\kappa_j$ represents the coefficient of cone, and $d_j$, $e_j$, $f_j$ and $g_j$ represents respective aspherical coefficients in the 4-th, 6-th, 8-th and 10-th orders of the j-th surfaces, respectively.

Figure 14:
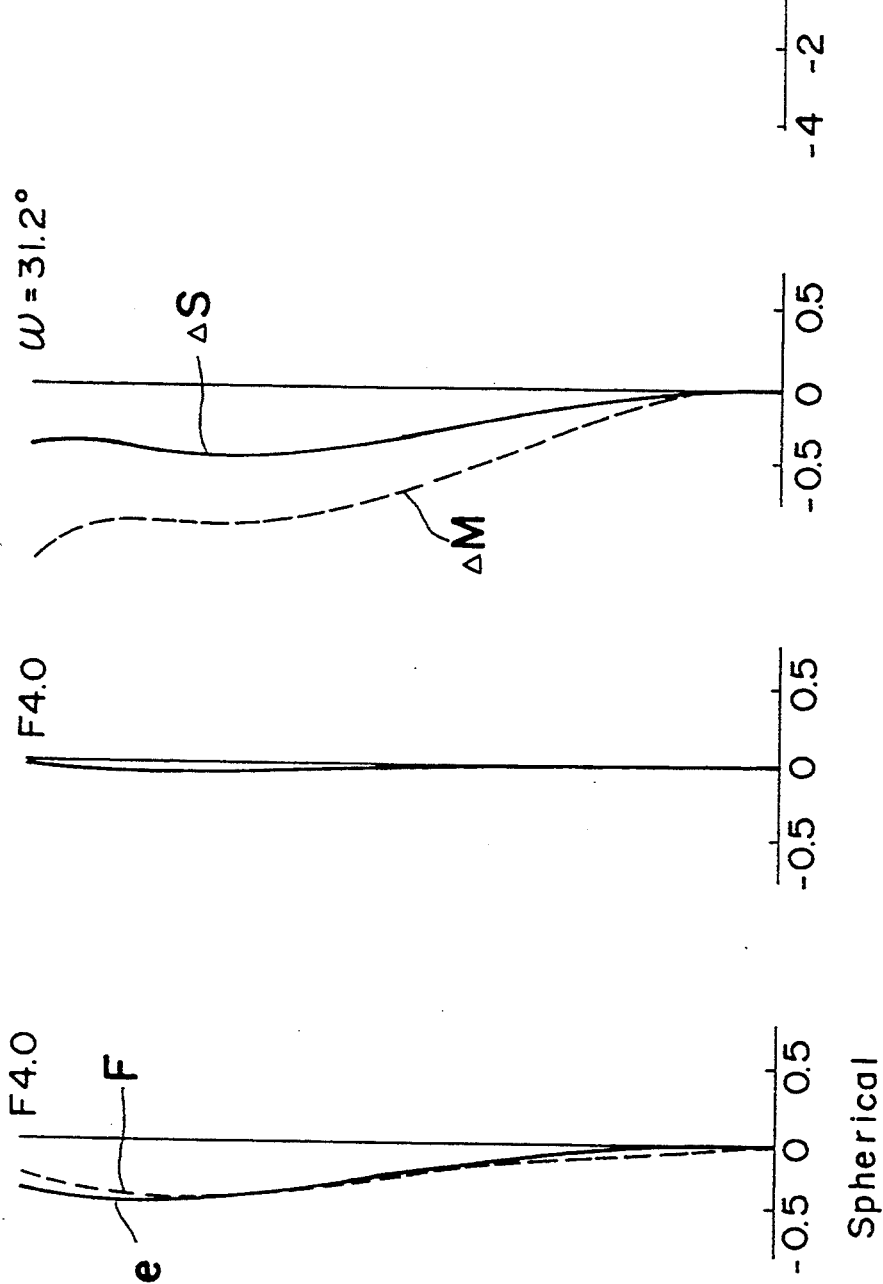

If the aspherical surface is introduced, the distortions in the projection optical system as a whole can be minimized as shown in FIG. 14.

As is the case with the first embodiment of the projection lens assembly of any one of the second to sixth embodiments of the present invention is a wide-angle projection lens assembly having a considerably great back focus ratio with the various aberrations corrected. In particular, although any one of the second to fourth embodiments of the present invention exhibits a somewhat considerable distortion, this is of a practically negligible level.

Figure 15:
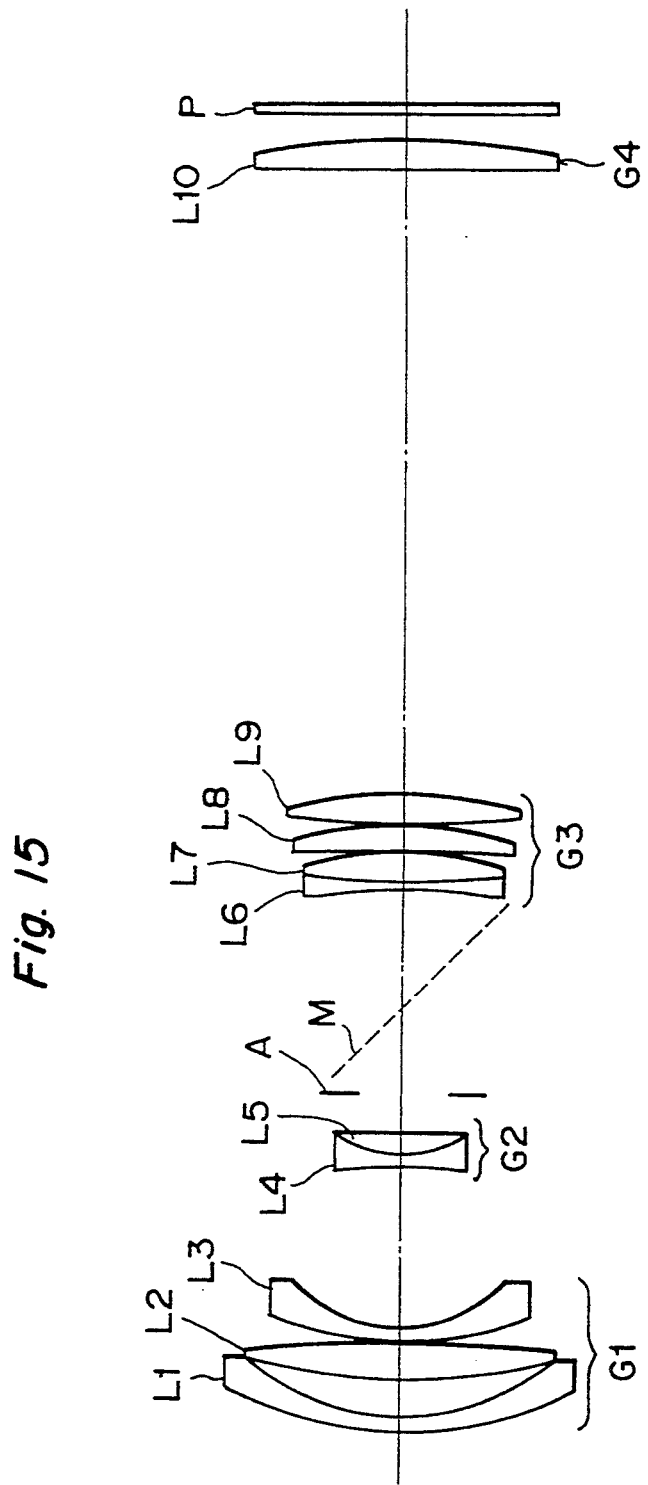
Figure 17:
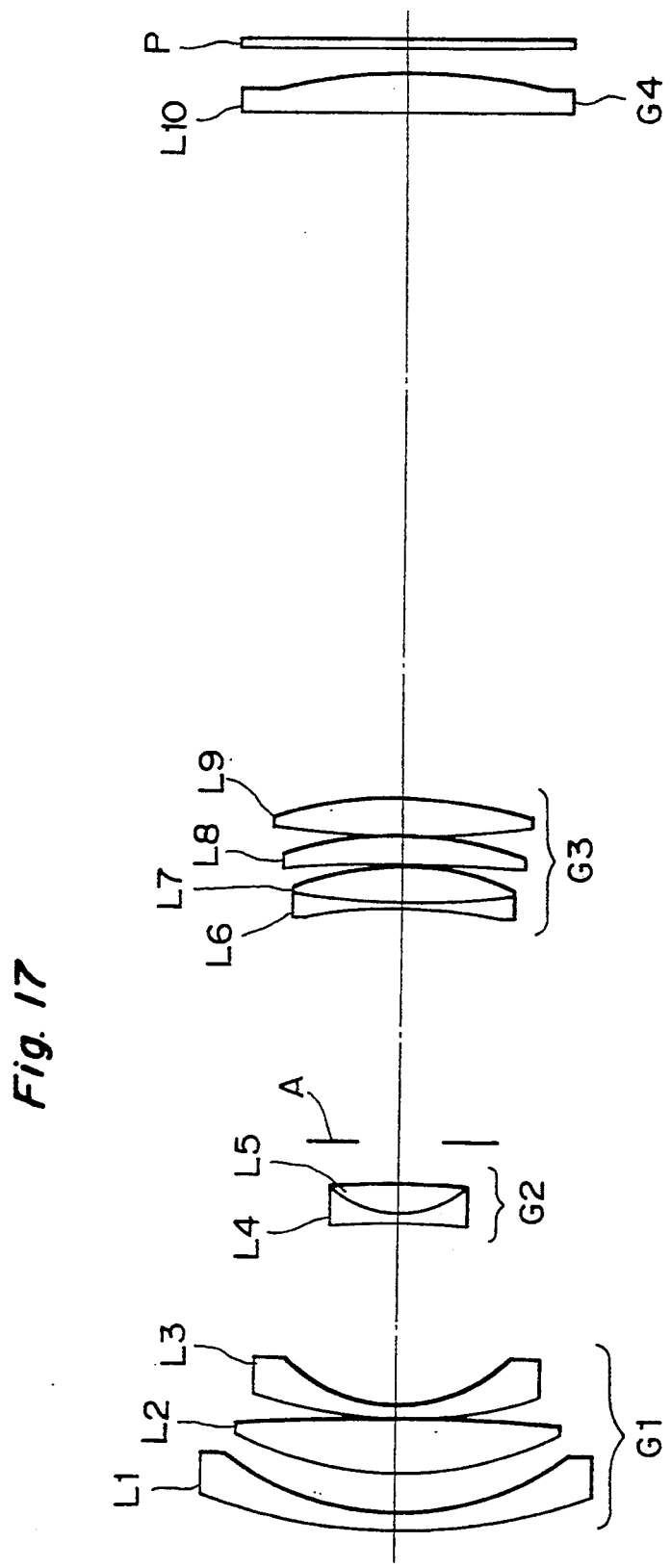
Figure 18:
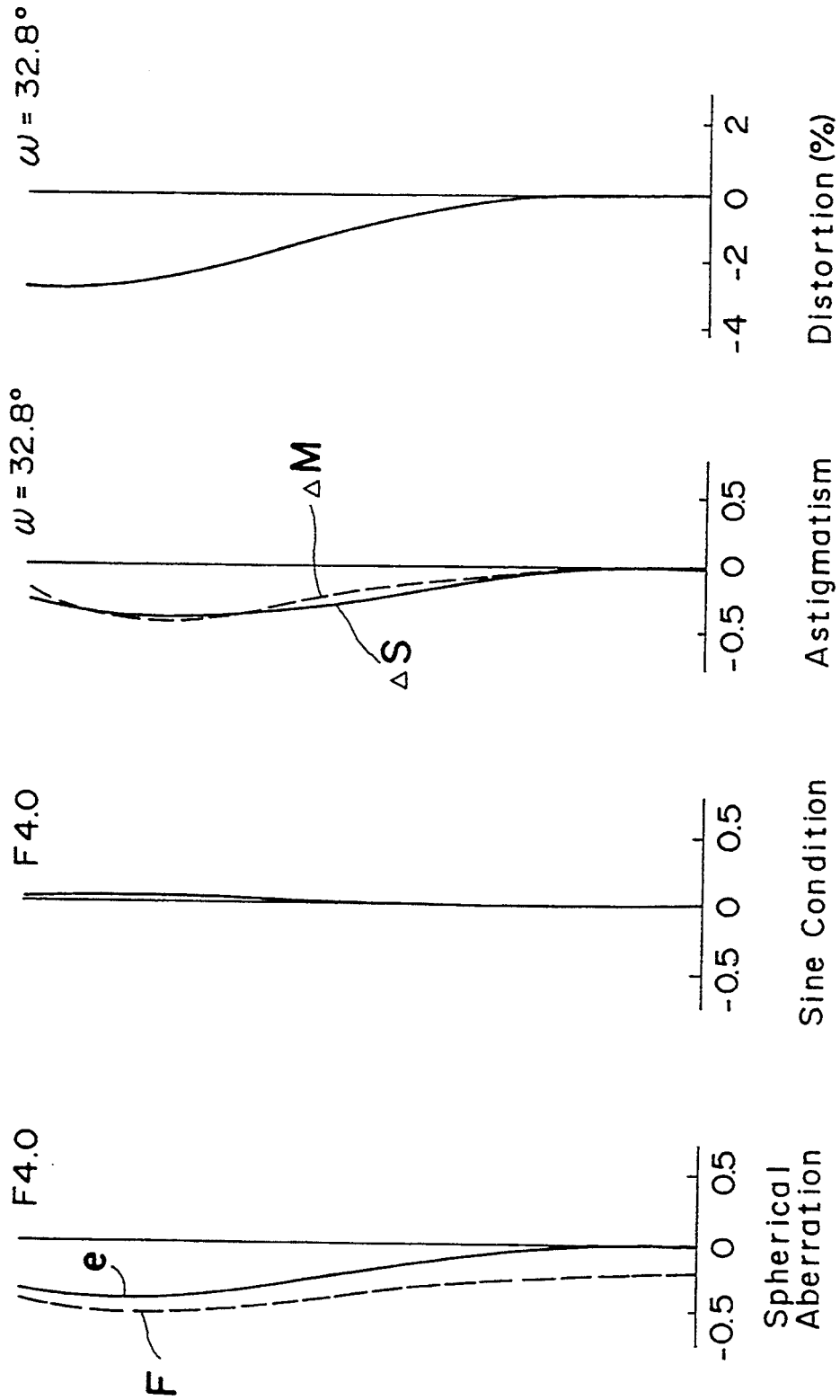
Figure 19:
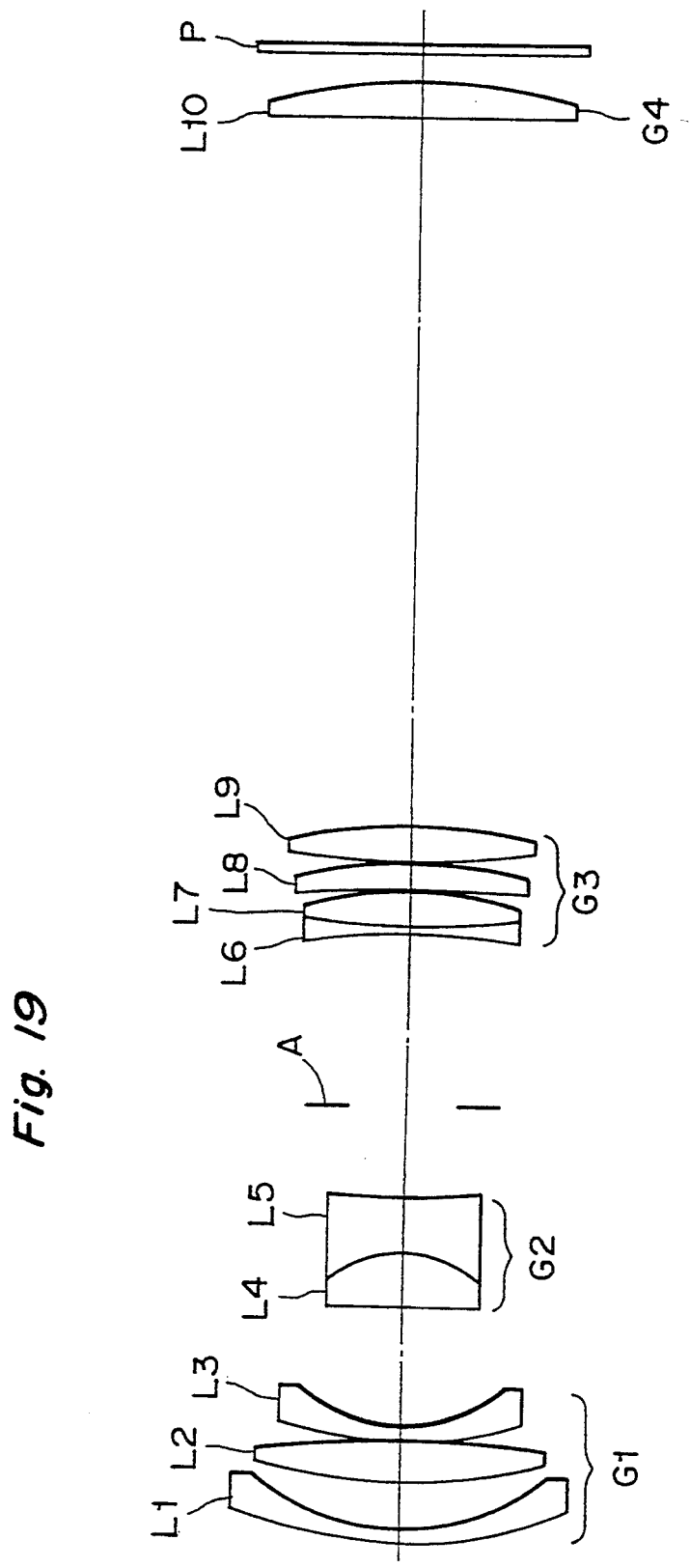
Figure 20:
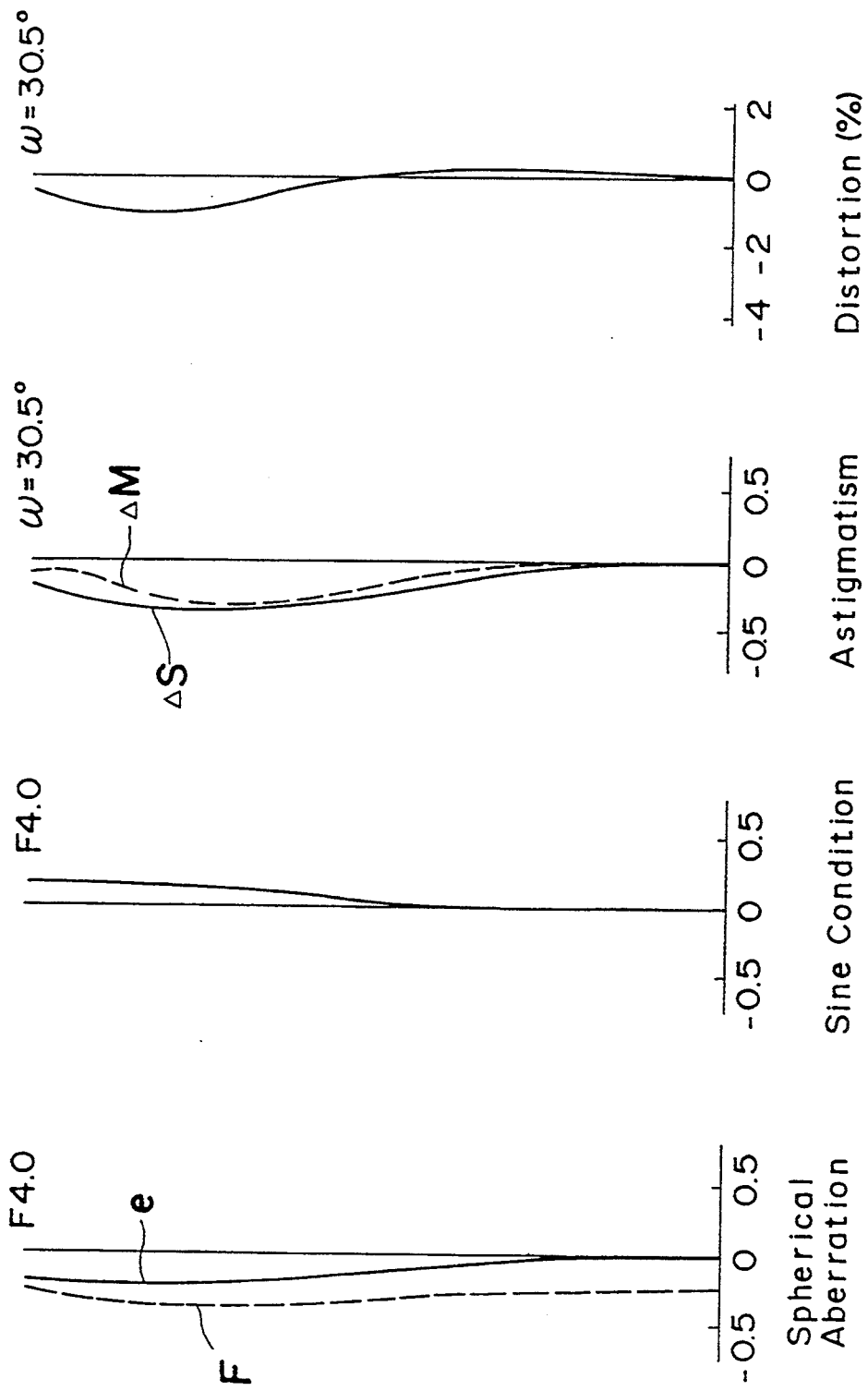
Figure 21:
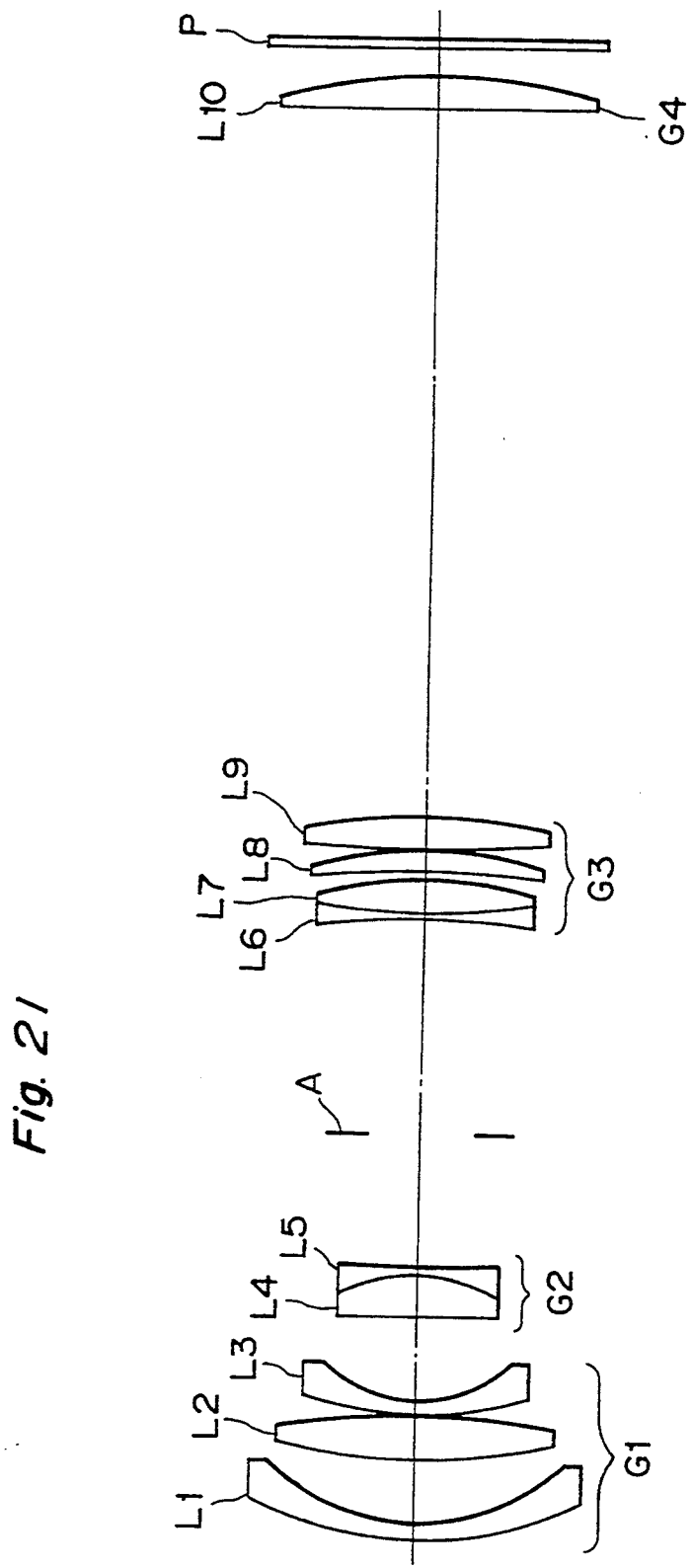
Figure 22:
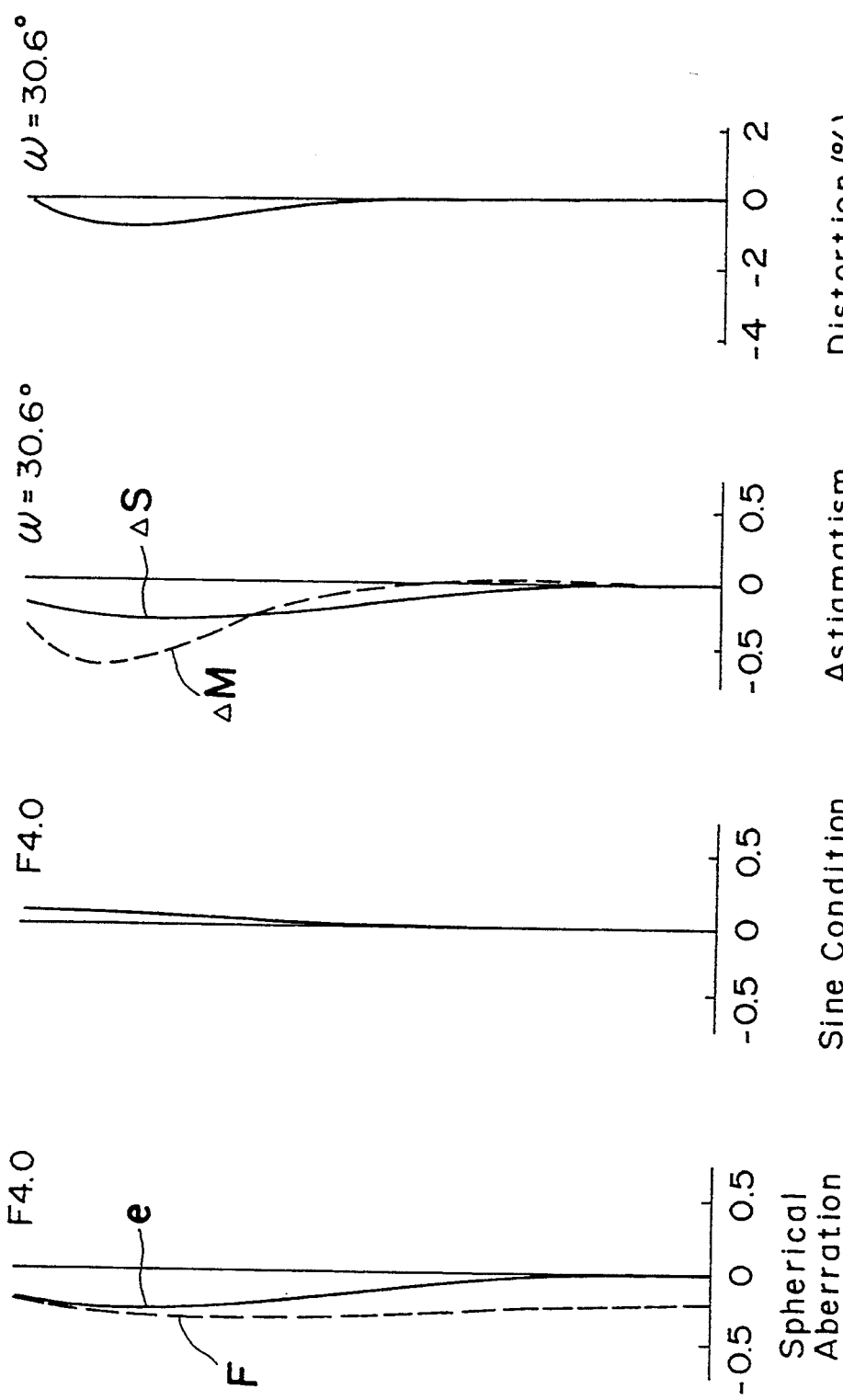
Figure 23:
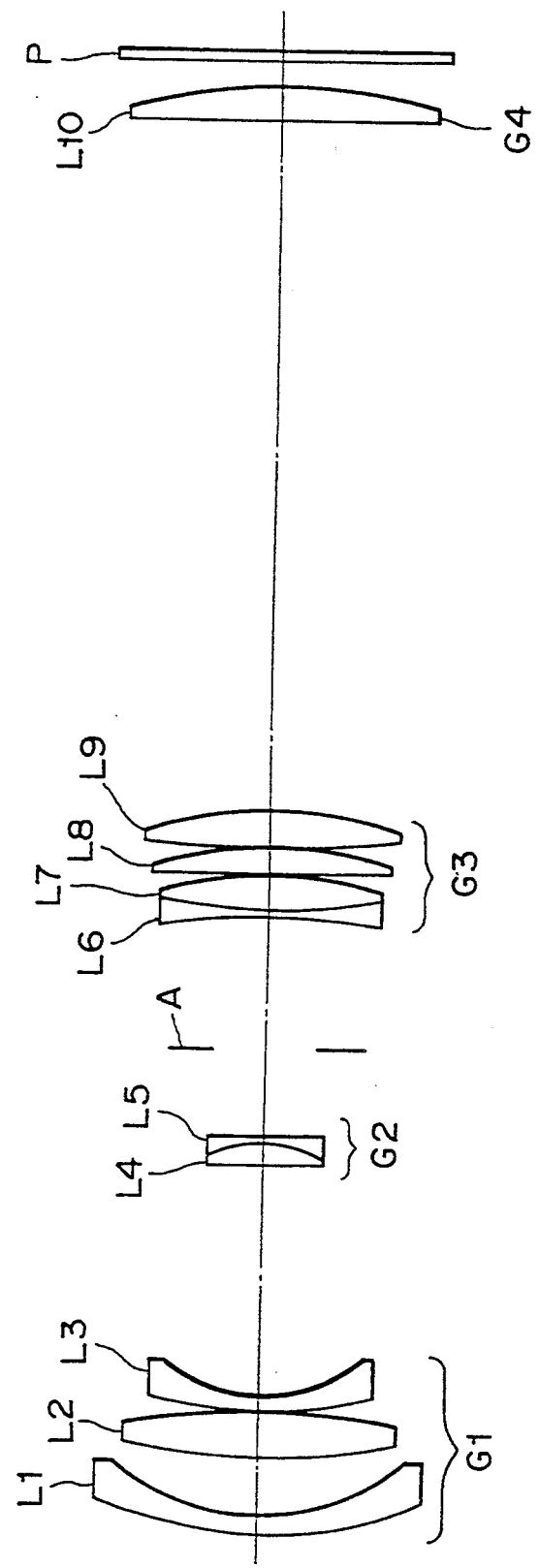
Figure 24:
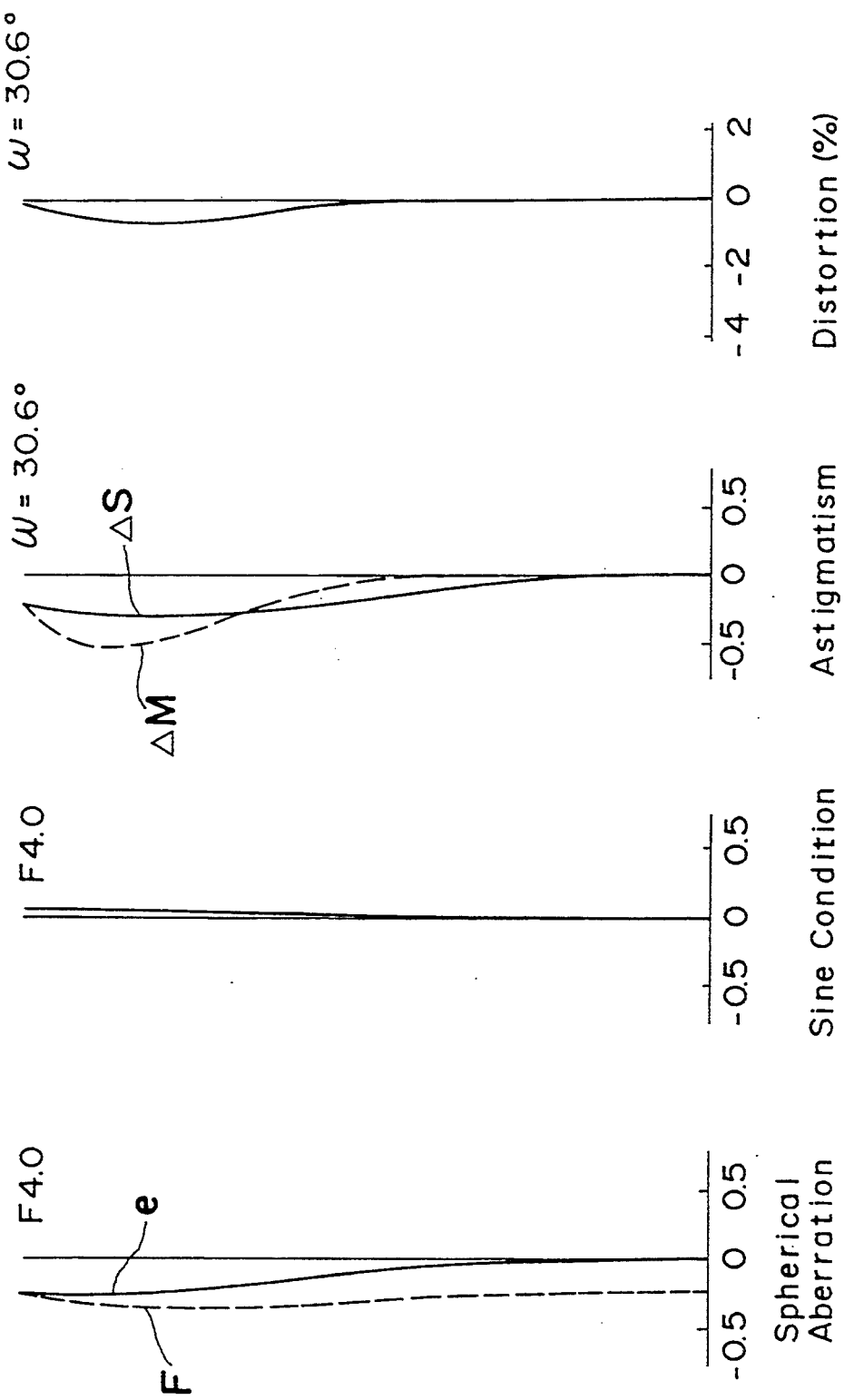
Figure 25:
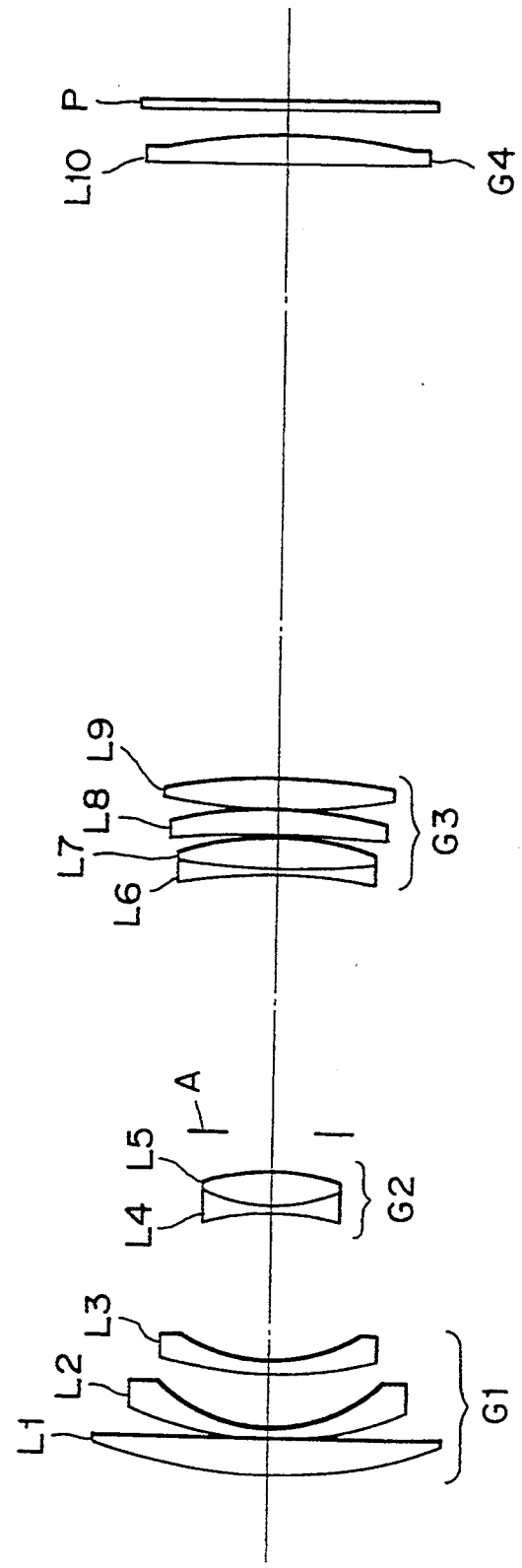
Figure 26:
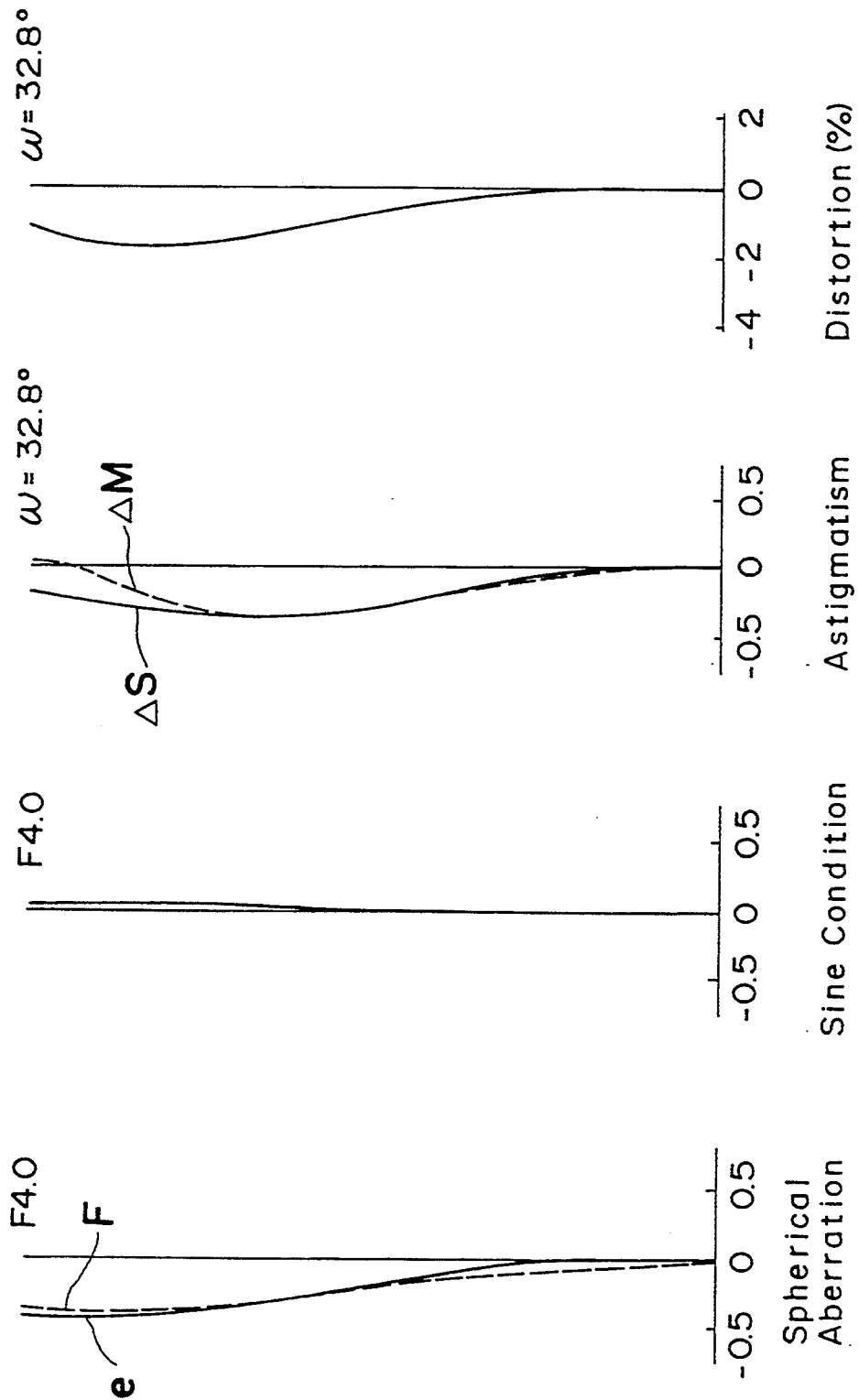

FIG. 15 illustrates a seventh preferred embodiment of the projection lens assembly according to the present invention. Specifications of the optical component parts of the projection lens assembly shown therein are tabulated in Table 7, while aberrations exhibited by the seventh embodiment are shown in FIGS. 18(a) to 18(d).

It is to be noted that in Table 7 the asterisk mark (*) indicates the aspheric lens having an aspherical surface of a profile represented by the foregoing equation (8).

TABLE 7

| | | | | | | |
|---|---|---|---|---|---|---|
| $f = 60.485$ | | $F = 4.0$ | | $\omega = 32.8°$ | | $m = -15.36$ |
| G1 | r1 = 106.598 | d1 = 3.00 | n1 = 1.59143 | v1 = 61.0 |
| | r2 = 59.404 | d2 = 10.00 | | |
| | r3 = 139.842 | d3 = 10.50 | n2 = 1.62408 | v2 = 36.1 |
| | r4 = −313.535 | d4 = 0.20 | | |
| | r5 = 96.488 | d5 = 3.00 | n3 = 1.66152 | v3 = 50.6 |
| | r6 = 38.226 | d6 = 43.08 | | |
| G2 | r7 = −200.746 | d7 = 2.00 | n4 = 1.69660 | v4 = 53.1 |
| | r8 = 25.909 | d8 = 7.00 | n5 = 1.62408 | v5 = 36.1 |
| | r9 = 3333.867 | d9 = 63.58 | | |
| G3 | r10 = −159.942 | d10 = 2.00 | n6 = 1.79192 | v6 = 25.5 |
| | r11 = 176.784 | d11 = 8.50 | n7 = 1.51825 | v7 = 63.8 |
| | r12 = −80.919 | d12 = 0.30 | | |
| | r13 = −408.570 | d13 = 6.70 | n8 = 1.51825 | v8 = 63.8 |
| | r14 = −96.022 | d14 = 0.20 | | |
| | r15 = 271.191 | d15 = 8.50 | n9 = 1.51825 | v9 = 63.8 |
| | r16 = −99.308 | d16 = 165.000 | | |
| G4 | r17 = ∞ | d17 = 8.00 | n10 = 1.49383 | v10 = 57.2 |
| | r18 = −106.476* | | | |
| P | $r_{P1} = \infty$ | $d_P = 2.20$ | $n_P = 1.51825$ | $v_P = 63.8$ |
| | $r_{P2} = \infty$ | | | |

Aspherical Coefficient:

| | | |
|---|---|---|
| $\kappa 18 = -6.88094 \times 10^{+1}$ | $d18 = -6.05128 \times 10^{-7}$ | $e18 = 3.42775 \times 10^{-10}$ |
| $f18 = -2.23470 \times 10^{-14}$ | $g18 = -2.41516 \times 10^{-17}$ | |
| $f_{G1}/f = -2.037$ | $f_{G2}/f = -2.554$ | $f_{G3}/f = 1.405$ |
| $f_{G4}/f = 3.565$ | $d_{G1}/f = 0.712$ | $d_{G2}/f = 1.051$ |
| $d_{G3}/f = 2.728$ | $(d_{G1} + d_{G2})/f = 1.763$ | $f_{G4}/d_{G3} = 1.307$ |

The first lens group G1 includes first to third lenses L1, L2 and L3; the second lens group G2 includes fourth and fifth lenses L4 and L5; the third lens group G3 includes sixth to ninth lenses L6, L7, L8 and L9; and the fourth lens group G4 includes a tenth lens L10. A relatively long spatial gap is provided between neighboring lens groups G1 and G2, G3 and G4. The first to tenth lenses L1 to L10 are arranged in the specified order from the side of the screen (i.e., the left as viewed in FIG. 15) and these lenses L1 to L10 are of the following types:

First lens L1 ... Negative meniscus lens. This lens is disposed with its convex surface oriented towards the screen side.

Second lens L2 ... Biconvex lens.

Third lens L3 ... Negative meniscus lens. This lens is disposed so as to have a convex surface oriented towards the screen side.

Fourth lens L4 ... Negative lens having opposite surfaces one of which has a small radius of curvature. This lens is so disposed as to have the surface having the small radius of curvature oriented towards the screen side.

Fifth lens L5 ... Positive lens having opposite surfaces one of which has a large radius of curvature. This lens is so disposed as to have the surface having the large radius of curvature oriented towards the screen side.

Sixth lens L6 ... Biconcave lens.

Seventh lens L7 ... Biconvex lens.

Eighth lens L8 ... Positive meniscus lens. This lens is disposed with its concave surface oriented towards the screen side.

Ninth lens L9 ... Biconvex lens.

Tenth lens L10 ... Plano-convex lens. This lens is disposed so as to have a flat surface oriented towards the screen side.

The fourth and fifth lenses L4 and L5 are cemented together while the sixth and seventh lenses L6 and L7 are cemented together. The eighteenth surface of the tenth lens L10 is aspherical. An optical system including the first to third lens group G1 to G3 and an optical system including the fourth lens group are hereinafter referred to as a primary lens group and an auxiliary lens group, respectively. The aperture A is positioned between the second and third lens groups G2 and G3, but adjacent the second lens group G2, for regulating both of the rays of light determinative of the F value and the off-axis rays. A planar mirror M for bending the path of travel of the rays of light can be disposed between the second and third lens groups G2 and G3 as shown by the phantom line in FIG. 15.

The function of each of the first to third lens groups G1 to G3 used in the seventh embodiment of the present invention is identical to that of each of the first to third lens groups G1 to G3 used in the first embodiment of the present invention, serving to correct the various aberrations in a well-balanced fashion.

The fourth lens group G4 functions to render the principal ray travelling in a space between it and the light valve P substantially parallel to the optical axis to thereby improve the telecentric characteristic. This characteristic can be attained when the principal rays passing across a predetermined position of the fourth lens group G4 are rendered parallel to the optical axis. If the fourth lens group G4 has an overall length which is long, a difficulty would arise in positioning two dichroic mirrors used to combine colors. Therefore, the fourth lens group G4 is constituted by a single lens having a rectangular shape. In order to further improve the telecentric characteristic, a surface adjacent the light valve is made aspherical. The other surface oriented towards the screen side is flat so that the fourth lens group G4 can be precisely mounted in a lens barrel. To facilitate mass-production, this lens is preferably made of acrylic resin by the use of a plastics molding technique.

Various aberrations occurring in the projection optical system characterized by Table 7 are shown in FIGS. 16(a) to 16(d). It is to be noted that, in these diagrams showing the various aberrations, aberrations resulting from the exit side glass substrate of the liquid crystal panel are included. As can be understood from FIG. 16, the aberrations are corrected in a well-balanced fashion. The half angle $\omega$ is a wide angle of 32.8° and the F value is 4.0 which is sufficient for the projection display apparatus utilizing the liquid crystal panel. The air gap between the third lens group G3 and the fourth lens group G4 is long enough to accommodate the two dichroic mirrors for color combining. Also, the angle formed between the principal ray passing through the light valve and the optical axis is not greater than ±1° within an effective display region. Since the vignetting factor at the maximum angle of field is 80% or higher, a sufficient amount of light can be secured from a peripheral region of the lens assembly.

The planar mirror M may be employed in the form of a surface mirror and, in such case, care must be taken concerning the flatness thereof. Needless to say, the projection lens assembly can be used without the planar mirror.

The eighth to twelfth embodiments of the projection lens assemblies according to the present invention are shown in FIGS. 17, 19, 21, 23 and 25, respectively. Specifications of the optical component parts of the projection lens assemblies of the eighth to twelfth embodiments are tabulated in Tables 8, 9, 10, 11 and 12, respectively, while aberrations exhibited by the projection lens assemblies are shown in FIGS. 18, 20, 22, 24 and 26, respectively.

TABLE 8

| | | f = 56.373 | F = 4.0 | $\omega$ = 32.8° | m = −16.55 |
|---|---|---|---|---|---|
| G1 | | r1 = 146.193 | d1 = 3.00 | n1 = 1.66152 | v1 = 50.6 |
| | | r2 = 65.152 | d2 = 10.00 | | |
| | | r3 = 81.108 | d3 = 13.00 | n2 = 1.60718 | v2 = 37.7 |
| | | r4 = −552.480 | d4 = 0.20 | | |
| | | r5 = 122.178 | d5 = 3.00 | n3 = 1.66152 | v3 = 50.6 |
| | | r6 = 41.551 | d6 = 43.84 | | |
| G2 | | r7 = −115.478 | d7 = 2.00 | n4 = 1.71615 | v4 = 53.6 |
| | | r8 = 24.454 | d8 = 7.00 | n5 = 1.62408 | v5 = 36.0 |
| | | r9 = −1112.380 | d9 = 65.32 | | |
| G3 | | r10 = −157.855 | d10 = 2.00 | n6 = 1.79192 | v6 = 25.5 |
| | | r11 = 204.273 | d11 = 8.50 | n7 = 1.51825 | v7 = 63.8 |
| | | r12 = −74.530 | d12 = 0.30 | | |
| | | r13 = −421.410 | d13 = 6.70 | n8 = 1.51825 | v8 = 63.8 |
| | | r14 = −103.490 | d14 = 0.20 | | |
| | | r15 = 230.114 | d15 = 8.50 | n9 = 1.51825 | v9 = 63.8 |
| | | r16 = −103.822 | d16 = 165.00 | | |
| G4 | | r17 = ∞ | d17 = 8.00 | n10 = 1.49383 | v10 = 57.2 |
| | | r18 = −96.864* | | | |
| | | rP1 = ∞ | dP = 2.20 | nP = 1.51825 | vP = 63.8 |

TABLE 8-continued

P [ $r_{P2} = \infty$

Aspherical Coefficient:

$\kappa18 = -3.27461 \times 10^{+1}$  $d18 = 2.79797 \times 10^{-7}$  $e18 = 2.56540 \times 10^{-10}$
$f18 = -2.10937 \times 10^{-13}$  $g18 = 1.18654 \times 10^{-16}$
$f_{G1}/f = -2.493$  $f_{G2}/f = -1.886$  $f_{G3}/f = 1.460$
$f_{G4}/f = 3.478$  $d_{G1}/f = 0.778$  $d_{G2}/f = 1.159$
$d_{G3}/f = 2.927$  $(d_{G1} + d_{G2})/f = 1.936$  $f_{G4}/d_{G3} = 1.189$

TABLE 9

$f = 60.509$   $F = 4.0$   $\omega = 30.5°$   $m = -15.36$

| | | | | | | | |
|---|---|---|---|---|---|---|---|
| G1 | r1 = | 112.754 | d1 = | 3.00 | n1 = 1.59143 | v1 = 61.0 |
| | r2 = | 60.466 | d2 = | 10.00 | | |
| | r3 = | 114.559 | d3 = | 10.50 | n2 = 1.62408 | v2 = 36.1 |
| | r4 = | −269.553 | d4 = | 0.20 | | |
| | r5 = | 111.591 | d5 = | 3.00 | n3 = 1.66152 | v3 = 50.6 |
| | r6 = | 35.325 | d6 = | 28.54 | | |
| G2 | r7 = | 4306.290 | d7 = | 13.40 | n4 = 1.62408 | v4 = 36.1 |
| | r8 = | −27.170 | d8 = | 12.45 | n5 = 1.69660 | v5 = 53.1 |
| | r9 = | 173.195 | d9 = | 62.87 | | |
| G3 | r10 = | −194.620 | d10 = | 2.00 | n6 = 1.79192 | v6 = 25.5 |
| | r11 = | 183.071 | d11 = | 8.50 | n7 = 1.51825 | v7 = 63.8 |
| | r12 = | −83.796 | d12 = | 0.30 | | |
| | r13 = | −509.902 | d13 = | 6.70 | n8 = 1.51825 | v8 = 63.8 |
| | r14 = | −97.465 | d14 = | 0.20 | | |
| | r15 = | 252.748 | d15 = | 8.50 | n9 = 1.51825 | v9 = 63.8 |
| | r16 = | −113.928 | d16 = | 169.15 | | |
| G4 | r17 = | ∞ | d17 = | 8.00 | n10 = 1.49383 | v10 = 57.2 |
| | r18 = | −87.188* | | | | |
| P | $r_{P1}$ = | ∞ | $d_P$ = | 2.20 | $n_P$ = 1.51825 | $v_P$ = 63.8 |
| | $r_{P2}$ = | ∞ | | | | |

Aspherical Coefficient:

$\kappa18 = -4.05946 \times 10^{+1}$  $d18 = -4.74285 \times 10^{-7}$  $e18 = 1.89496 \times 10^{-10}$
$f18 = 2.09117 \times 10^{-13}$  $g18 = 1.00847 \times 10^{-17}$
$f_{G1}/f = -1.790$  $f_{G2}/f = -2.499$  $f_{G3}/f = 1.384$
$f_{G4}/f = 2.918$  $d_{G1}/f = 0.472$  $d_{G2}/f = 1.039$
$d_{G3}/f = 2.795$  $(d_{G1} + d_{G2})/f = 1.511$  $f_{G4}/d_{G3} = 1.044$

TABLE 10

$f = 60.345$   $F = 4.0$   $\omega = 30.6°$   $m = -15.36$

| | | | | | | | |
|---|---|---|---|---|---|---|---|
| G1 | r1 = | 91.348 | d1 = | 3.00 | n1 = 1.51825 | v1 = 63.8 |
| | r2 = | 50.197 | d2 = | 15.00 | | |
| | r3 = | 155.383 | d3 = | 10.00 | n2 = 1.65222 | v2 = 33.6 |
| | r4 = | −216.061 | d4 = | 0.85 | | |
| | r5 = | 97.077 | d5 = | 3.00 | n3 = 1.68081 | v3 = 55.2 |
| | r6 = | 31.614 | d6 = | 20.00 | | |
| G2 | r7 = | −1431.057 | d7 = | 9.78 | n4 = 1.65222 | v4 = 33.6 |
| | r8 = | −44.882 | d8 = | 2.00 | n5 = 1.68081 | v5 = 55.2 |
| | r9 = | 397.165 | d9 = | 79.77 | | |
| G3 | r10 = | −364.035 | d10 = | 2.00 | n6 = 1.81265 | v6 = 25.3 |
| | r11 = | 145.998 | d11 = | 7.60 | n7 = 1.51825 | v7 = 63.8 |
| | r12 = | −97.325 | d12 = | 1.70 | | |
| | r13 = | −426.566 | d13 = | 5.40 | n8 = 1.51825 | v8 = 63.8 |
| | r14 = | −92.399 | d14 = | 0.20 | | |
| | r15 = | 422.296 | d15 = | 8.00 | n9 = 1.51825 | v9 = 63.8 |
| | r16 = | −120.257 | d16 = | 165.00 | | |
| G4 | r17 = | ∞ | d17 = | 7.00 | n10 = 1.49383 | v10 = 57.2 |
| | r18 = | −89.525* | | | | |
| P | $r_{P1}$ = | ∞ | $d_P$ = | 2.20 | $n_P$ = 1.51825 | $v_P$ = 63.8 |
| | $r_{P2}$ = | ∞ | | | | |

Aspherical Coefficient:

$\kappa18 = -3.98925 \times 10^{+1}$  $d18 = -9.86547 \times 10^{-7}$  $e18 = 3.07179 \times 10^{-10}$
$f18 = -2.07551 \times 10^{-13}$  $g18 = 1.21892 \times 10^{-16}$
$f_{G1}/f = -1.402$  $f_{G2}/f = -5.883$  $f_{G3}/f = 1.482$
$f_{G4}/f = 3.005$  $d_{G1}/f = 0.331$  $d_{G2}/f = 1.322$
$d_{G3}/f = 2.734$  $(d_{G1} + d_{G2})/f = 1.653$  $f_{G4}/d_{G3} = 1.099$

TABLE 11

$f = 60.293$   $F = 4.3$   $\omega = 30.6°$   $m = -15.36$

| | | | | | |
|---|---|---|---|---|---|
| r1 = | 99.398 | d1 = | 3.00 | n1 = 1.51825 | v1 = 63.8 |

TABLE 11-continued

| | | | | | | |
|---|---|---|---|---|---|---|
| G1 | r2 = 52.135 | d2 = 15.00 | | | | |
| | r3 = 168.868 | d3 = 10.00 | n2 = 1.65222 | $\nu 2 = 33.6$ | | |
| | r4 = −204.627 | d4 = 0.85 | | | | |
| | r5 = 116.583 | d5 = 3.00 | n3 = 1.68081 | $\nu 3 = 55.2$ | | |
| | r6 = 34.618 | d6 = 55.00 | | | | |
| G2 | r7 = −1192.442 | d7 = 4.00 | n4 = 1.65222 | $\nu 4 = 33.6$ | | |
| | r8 = −36.333 | d8 = 2.00 | n5 = 1.68081 | $\nu 5 = 55.2$ | | |
| | r9 = 500.097 | d9 = 52.09 | | | | |
| G3 | r10 = −214.689 | d10 = 2.00 | n6 = 1.81265 | $\nu 6 = 25.3$ | | |
| | r11 = 133.307 | d11 = 7.60 | n7 = 1.51825 | $\nu 7 = 63.8$ | | |
| | r12 = −105.752 | d12 = 1.70 | | | | |
| | r13 = −1927.078 | d13 = 5.40 | n8 = 1.51825 | $\nu 8 = 63.8$ | | |
| | r14 = −92.932 | d14 = 0.20 | | | | |
| | r15 = 277.825 | d15 = 8.00 | n9 = 1.51825 | $\nu 9 = 63.8$ | | |
| | r16 = −105.824 | d16 = 165.00 | | | | |
| G4 | r17 = ∞ | d17 = 7.00 | n10 = 1.49383 | $\nu 10 = 57.2$ | | |
| | r18 = −108.490* | | | | | |
| P | $r_{P1} = \infty$ | $d_P = 2.20$ | $n_P = 1.51825$ | $\nu_P = 63.8$ | | |
| | $r_{P2} = \infty$ | | | | | |

Aspherical Coefficient:
$\kappa 18 = -6.66516 \times 10^{+1}$   $d18 = -8.21940 \times 10^{-7}$   $e18 = 2.79799 \times 10^{-10}$
$f18 = -1.94168 \times 10^{-13}$   $g18 = 1.16597 \times 10^{-16}$
$f_{G1}/f = -1.444$   $f_{G2}/f = -6.138$   $f_{G3}/f = 1.449$
$f_{G4}/f = 3.644$   $d_{G1}/f = 0.921$   $d_{G2}/f = 0.864$
$d_{G3}/f = 2.737$   $(d_{G1} + d_{G2})/f = 1.776$   $f_{G4}/d_{G3} = 1.331$

TABLE 12 f = 56.408    F = 4.0    ω = 32.8°    m = −16.55

| | | | | | | |
|---|---|---|---|---|---|---|
| G1 | r1 = 145.383 | d1 = 9.00 | n1 = 1.51825 | $\nu 1 = 63.8$ | | |
| | r2 = 1845.534 | d2 = 0.20 | | | | |
| | r3 = 93.695 | d3 = 3.00 | n2 = 1.59143 | $\nu 2 = 61.0$ | | |
| | r4 = 47.121 | d4 = 14.70 | | | | |
| | r5 = 113.826 | d5 = 3.00 | n3 = 1.69660 | $\nu 3 = 53.1$ | | |
| | r6 = 47.820 | d6 = 39.69 | | | | |
| G2 | r7 = −54.018 | d7 = 2.00 | n4 = 1.69660 | $\nu 4 = 53.1$ | | |
| | r8 = 37.545 | d8 = 9.00 | n5 = 1.62408 | $\nu 5 = 36.1$ | | |
| | r9 = −56.483 | d9 = 79.95 | | | | |
| G3 | r10 = −132.019 | d10 = 2.00 | n6 = 1.79192 | $\nu 6 = 25.5$ | | |
| | r11 = 241.207 | d11 = 8.50 | n7 = 1.51825 | $\nu 7 = 63.8$ | | |
| | r12 = −71.420 | d12 = 0.30 | | | | |
| | r13 = −311.482 | d13 = 6.70 | n8 = 1.51825 | $\nu 8 = 63.8$ | | |
| | r14 = −114.074 | d14 = 0.20 | | | | |
| | r15 = 176.276 | d15 = 8.50 | n9 = 1.51825 | $\nu 9 = 63.8$ | | |
| | r16 = −137.440 | d16 = 165.00 | | | | |
| G4 | r17 = ∞ | d17 = 8.00 | n10 = 1.49383 | $\nu 10 = 57.2$ | | |
| | r18 = −96.369* | | | | | |
| P | $r_{P1} = \infty$ | $d_P = 2.20$ | $n_P = 1.51825$ | $\nu_P = 63.8$ | | |
| | $r_{P2} = \infty$ | | | | | |

Aspherical Coefficient:
$\kappa 18 = -4.02603 \times 10^{+1}$   $d18 = -7.81059 \times 10^{-7}$   $e18 = 1.52193 \times 10^{-9}$
$f18 = -7.58747 \times 10^{-13}$   $g18 = 2.44728 \times 10^{-16}$
$f_{G1}/f = -1.622$   $f_{G2}/f = -6.495$   $f_{G3}/f = 1.703$
$f_{G4}/f = 3.459$   $d_{G1}/f = 0.704$   $d_{G2}/f = 1.417$
$d_{G3}/f = 2.925$   $(d_{G1} + d_{G2})/f = 2.121$   $f_{G4}/d_{G3} = 1.182$ The eighth embodiment of the present invention has a structure similar to that of the seventh embodiment. However, any one of the ninth to eleventh embodiments of the present invention differs from the seventh embodiment in that the second lens group G2 includes the positive and negative lenses arranged in this order from the screen side, whereas the twelfth embodiment of the present invention is similar to the first embodiment except with respect to the order of positive, negative and negative lenses which constitute the first lens group G1.

In any one of the eighth to twelfth embodiments of the present invention, a planar mirror may be disposed between the second and third lens groups G2 and G3. In particular, in the eleventh embodiment, the planar mirror may be disposed between the first and second lens groups G1 and G2.

As is the case with the seventh embodiment of the present invention, any one of the eighth to twelfth embodiments of the present invention is a wide-angle projection lens assembly wherein the air gap between the third and fourth lens groups G3 and G4 is sufficiently large, with the various aberrations corrected. Also, the angle formed between the principal ray passing through the light valve and the optical axis is not greater than ±2° within an effective display region.

Some embodiments of the projection display apparatus according to the present invention will now be described.

Figure 27:
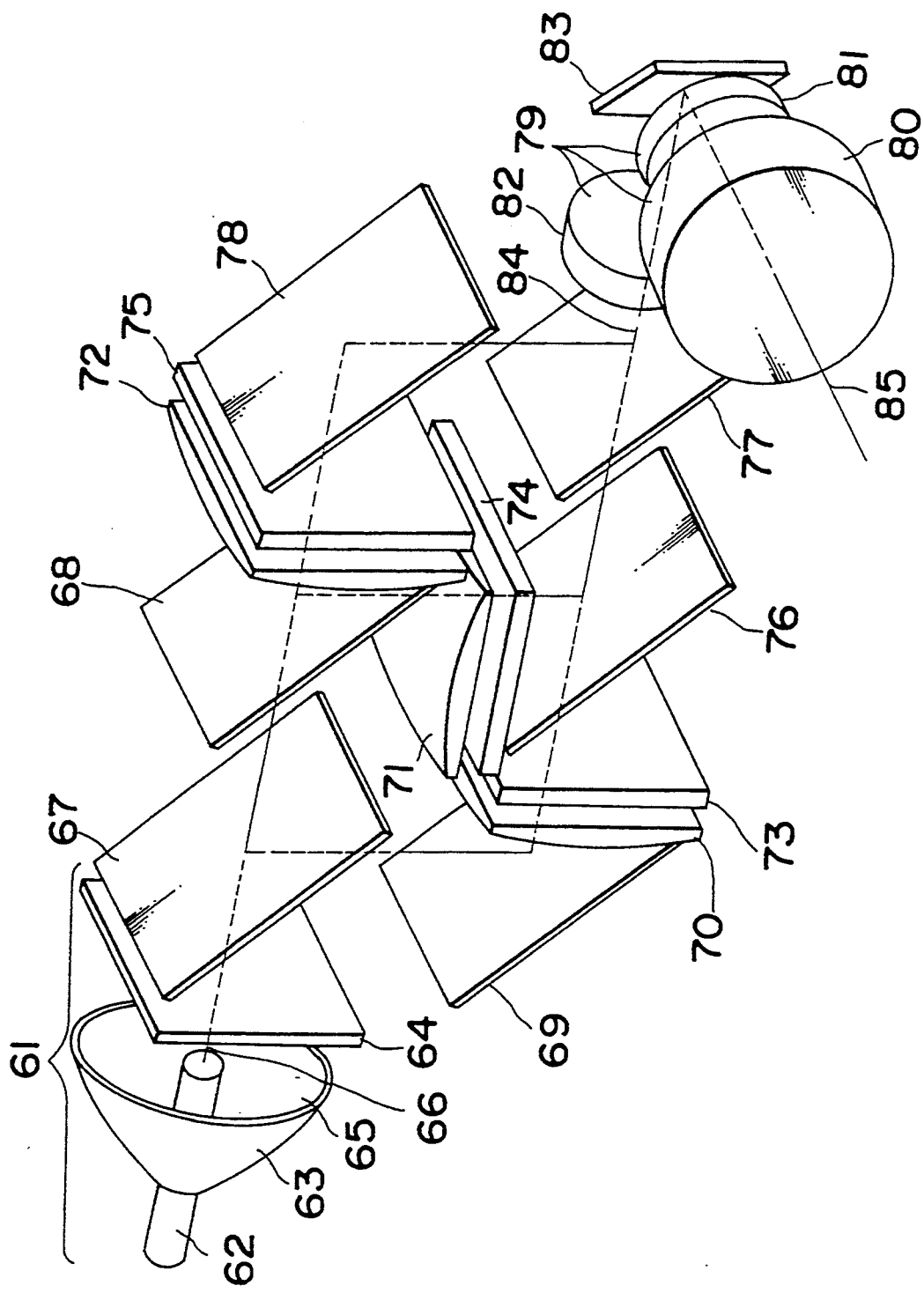
FIGS. 27 and 28 are schematic perspective views of different embodiments of a projector according to the present invention.

A first embodiment of the projector is shown in FIG. 27. As shown therein, a light source 61 is constituted by a lamp 62 in the form of a metal halide lamp, a concave mirror 63 and a filter 64. The concave mirror 63 is made of glass having a generally parabolic reflecting surface 65 deposited with a multi-layered coating operable to pass infrared rays of light therethrough, but reflecting visible rays of light. The filter 64 is a glass substrate having a multi-layered coating operable to pass visible rays of light therethrough, but reflecting both infrared and ultraviolet rays of light. The concave mirror 63 has an optical axis 66 oriented horizontally and the lamp 62 has an elongate tube aligned with the optical axis 66. Radiation from the lamp 62 is, after having been reflected by the concave mirror 63 to remove the infrared component thereof, converted into generally parallel rays of light which subsequently pass through the filter 64 by which both infrared and ultraviolet components of the radiation are removed while the visible rays of light are allowed to emerge outwardly therefrom.

Radiation from the light source 61 is separated into red, green and blue colors by a color separating optical system comprising of two dichroic mirrors 67 and 68 and a planar mirror 69. The rays of light in these three primary colors are transmitted to liquid crystal panels 73, 74 and 75 through respective field lenses 70, 71 and 72. Each of the liquid crystal panels 73 to 75 is in the form of a TFT liquid crystal panel utilizing twisted nematic liquid crystal and forms an optical image as a function of a change in transmissivity in response to a video signal applied thereto.

Images of light emerging from the liquid crystal panels 73 to 75 are combined by a color combining optical system, comprising dichroic mirrors 76 and 77 and a planar mirror 78, to provide a combined image which is subsequently transmitted to a projection lens assembly 79. The projection lens assembly 79 shown in FIG. 27 is of the construction shown in and described with reference to FIG. 3 and includes a first lens group 80, a second lens group 81 and a third lens group 82, arranged in this order from the screen side, with a planar mirror 83 disposed between the second and third lens groups 81 and 82. Respective images formed on the liquid crystal panels 73, 74 and 75 are projected on an enlarged scale onto a screen (not shown) positioned a distance from the projection lens assembly 79.

The component parts ranging from the light source 61 to the projection lens assembly 79 constitute the projector with the light source 61 and the projection lens assembly 79 disposed above and below the projector. Assuming that the plane containing both the optical axis of the concave mirror 63 and an optical axis 84 of the third lens group 82 is defined as a reference plane, respective normals to the three liquid crystal panels 73 to 75 are parallel to the reference plane, and an optical axis 85 of the first lens group 80 is perpendicular to the reference plane. However, although it may be contemplated to lay the normals to the liquid crystal panels perpendicular to the reference plane while the optical axis 85 of the first lens group 80 be parallel to the reference plane, there is a problem in that, since each of the liquid crystal panels has a width, as viewed in a horizontal direction of the image formed thereon, which is greater than the height thereof as viewed in a vertical direction of the image formed thereon, the back focus of the projection lens assembly 79 must be increased resulting in a difficulty in correcting the resultant aberrations.

Convergence adjustment of the projected picture can be accomplished by finely moving the liquid crystal panels 73, 74 and 75 back and forth. In such case, two colors may become out of focus, but this can be practically negligible since the projection lens assembly shown in FIG. 3 exhibits a small chromatic aberration on axis and a small chromatic aberration of magnification.

Focus adjustment of the projected picture can be accomplished by moving the second lens group 81 of the projection lens assembly 79 along the optical axis 85. Alternatively, it may be accomplished by moving a combination of the first and second lens groups 80 and 81 finely along the optical axis 85. The focus adjustment of the first or third lens group 80 or 82 requires the lens group to be moved a substantial distance since the amount of movement of a Gaussian image plane relative to the amount of movement of the lens group is small, resulting in an undesirable deterioration of the balance of aberration.

Figure 28:
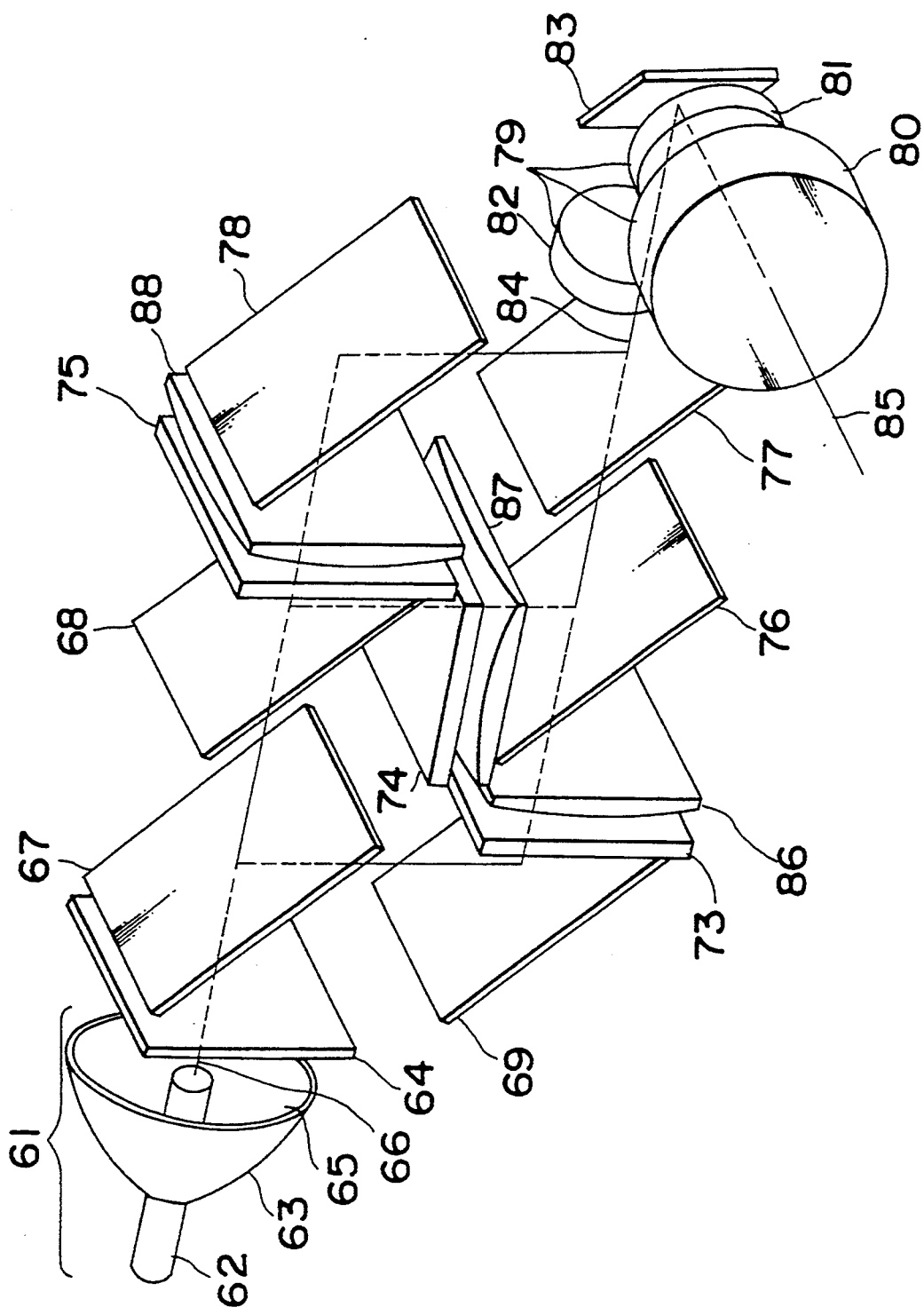

The structure of the projector employing the projection lens assembly of FIG. 15 is shown in FIG. 28. This is substantially similar to that shown in FIG. 27 except that, instead of the field lenses employed in FIG. 27, auxiliary lenses 86, 87 and 88 are disposed on an exit side of the associated liquid crystal panels 73, 74 and 75 in FIG. 28.

In the example shown in FIG. 28, it is recommended that the primary lens group 79, including the first to third lens groups 80, 81 and 82, the three auxiliary lenses 86 to 88, the color combining dichroic mirrors 76 and 77 and the planar mirrors 78 and 83 all be accommodated in a single lens barrel. By so doing, the optical system ranging from the auxiliary lenses 86 to 88 to the first lens group 80 can be precisely assembled. The dichroic mirrors 76 and 77 and the planar mirrors 78 and 83 should be considered as parts of the projection lens assembly.

The projection lens assembly shown in FIG. 15 has a peculiarity in that the telecentric characteristic is excellent, and therefore, care must be taken in securing a convergence performance of the projected picture. When an ordinary projection lens assembly having no telecentric characteristic is employed, the convergence adjustment can be accomplished by finely moving the liquid crystal panels in a direction parallel to an image forming surface and in a direction parallel to the optical axis. However, since the projection lens assembly employed in the projector of FIG. 28 has an excellent telecentric characteristic, a fine movement of the liquid crystal panels 73 to 75 back and forth results in a defocusing with no change occurring in the size of the projected picture. In such case, if the chromatic aberration of magnification exhibited by the projection lens assembly is sufficiently small, the convergence performance can be secured. Since the projection lens assembly according to the present invention has plenty of margin in correcting both the on-axis chromatic aberration and the chromatic aberration of magnification, correction of the chromatic aberration of magnification to a sufficiently small value does not pose a detrimental problem. If it is still insufficient, it is recommended to accomplish the convergence adjustment by finely moving the auxiliary lenses 86 to 88 along the optical axis. In such case, it may happen that the two colors are defocused, but it does not constitute any practical problem since the projection lens assembly shown in FIG. 15 exhibits a reduced on-axis chromatic aberration and a chromatic aberration of magnification.

Figure 29:
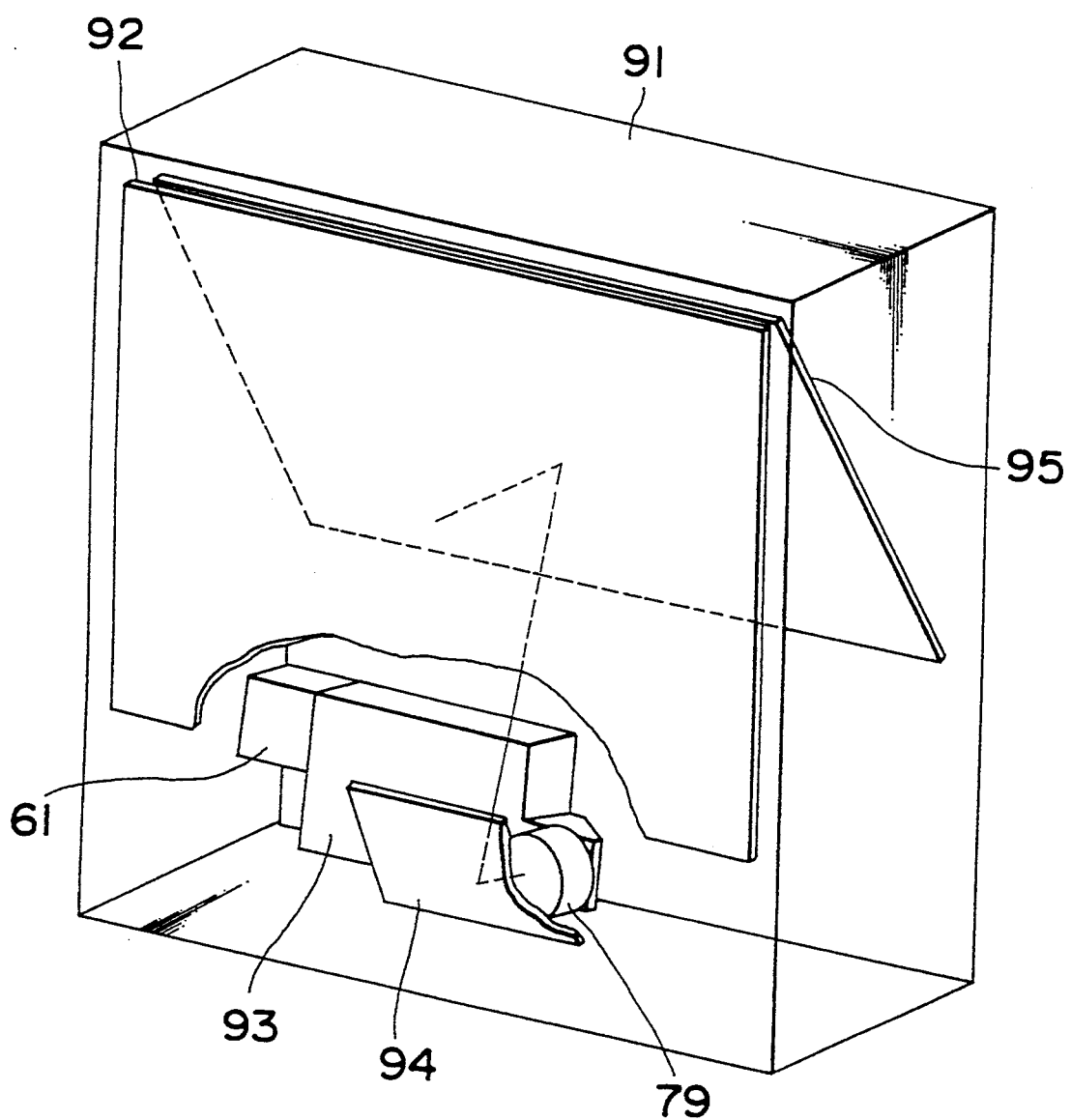
FIG. 29 is a schematic perspective view of the projection display apparatus showing various component parts installed within a cabinet.
Figure 30B:
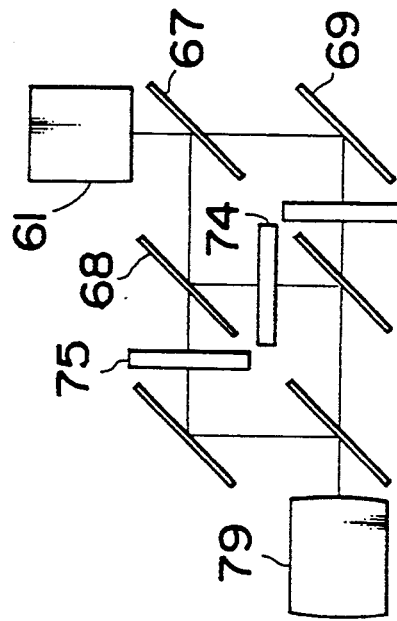
FIGS. 30(a) to 30(d) are schematic diagrams showing various layouts of the optical component parts of the projector.
Figure 30A:
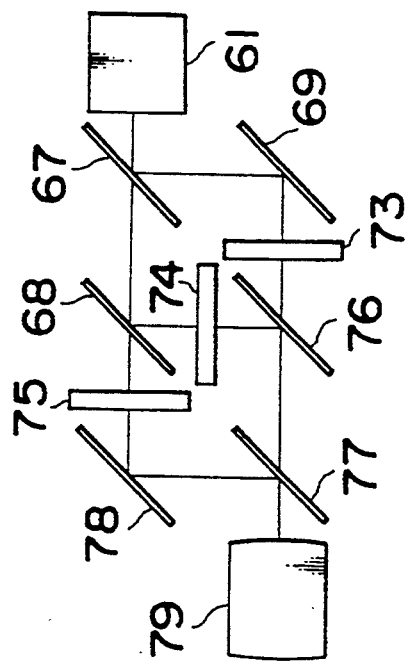
Figure 30D:
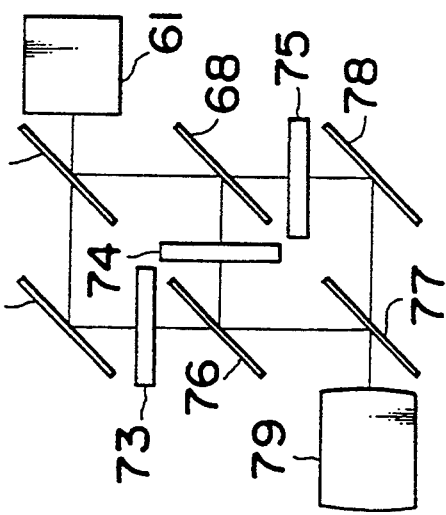
Figure 30C:
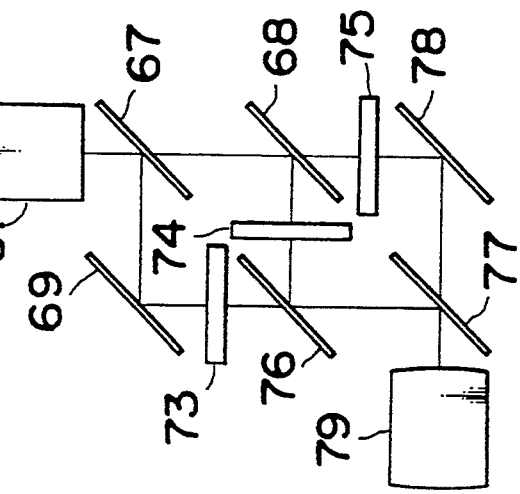

The projection display apparatus according to the present invention is installed within a cabinet 91 in a manner as shown in FIG. 29. The cabinet 91 has a screen 92 installed at a front upper portion thereof, a projector 93 at a rear lower portion thereof, a first planar mirror 94 at a front lower portion thereof, and a second planar mirror 95 at a position rearwardly of the screen 92. The projector 93 is of a construction shown in and described with reference to FIG. 28. The light source 61 is positioned upwardly of the projector 93. The primary lens group 79 has the planar mirror 83 built therein and is positioned at a lower portion of the projector 93. The optical axis 66 of the concave mirror 63 is parallel to the screen 92. Radiation from the primary lens group 79 is, after having reflected by the first planar mirror 94 and then the second planar mirror 95, transmitted to the screen 92. In this way, the respective optical images formed on the three liquid crystal panels 73 to 75 are projected onto the screen 92 from the rear.

It is to be noted that the projector 93 employed in the apparatus shown in FIG. 29 may be of a construction shown in and described with reference to FIG. 27.

Sizes of the various component parts shown in FIGS. 27 to 29 are as follows. The screen has an effective display size of 43 diagonal inches (having an aspect ratio of 4:3); each of the liquid crystal panels has an image size of 2.8 diagonal inches; the projection lens assembly has a focal length of about 60 mm; the distance of projection is 860 mm; the cabinet is 940 mm high, 950 mm wide and 430 mm deep. Notwithstanding the large size display available, the apparatus as a whole can be made considerably compact partly because the installation of the planar mirror 83 within the primary lens group 79 has resulted in a reduction in depth of the projector 93 and partly because the primary lens group 79 has a focal length small enough to reduce the distance of projection.

According to the structure shown in any one of FIGS. 27 to 29, since the substantially single projection lens assembly is employed, no color shift occurs. In addition, since the path of travel of the rays of light from the light source 61 to each of the liquid crystal panels 73 to 75 is equal for all of the colors and the center of each of the liquid crystal panels 73 to 75 is aligned with the optical axis of the projection lens assembly, the possibility of the color non-uniformity is reduced. Since the telecentric characteristic is excellent, no considerable variation in image quality of the projected picture will occur considerably. Yet, since no color shift occurs, a lenticular plate having lenticular lenslets on both surfaces does not need to be used, making the screen simple enough in structure to reduce the manufacturing cost. Further, in the system wherein the three projection lens assemblies are employed, unless the projector is installed within the cabinet, neither the focus adjustment nor the convergence adjustment is carried out. On the other hand, the structure shown in any one of FIGS. 27 to 29 is advantageous in that the optical system can easily be adjusted by incorporating, after the convergence adjustment has been accomplished by projecting the rays of light from the projector 93 onto a reflection-type screen, the projector 93 within the cabinet and then by performing the focus adjustment.

Hereinafter, other embodiments of the projection display apparatus of the present invention will be described.

The optical system of the projector may be varied in numerous ways. Even though the arrangement of the dichroic mirrors of the color separating optical system, and those of the color combining optical system remain the same, four optical systems can be put into practice depending on the position of the light source 61 and/or the position of the projection lens assembly 79, as shown in FIGS. 30(a) to 30(d), noting that the spectral transmissivity necessary in the dichroic mirrors varies with a particular optical system. The invention can also be embodied as systems wherein the normals to the respective liquid crystal panels are rendered parallel to a plane (reference plane) containing the optical axis for the radiation from the light source 61 and that for the incoming light of the projection lens assembly 79, and wherein the normals to the respective liquid crystal panels are rendered perpendicular to the plane (reference plane) containing the optical axis for the radiation from the light source 61 and that for the incoming light of the projection lens assembly 79. The projection lens assembly 79 may or may not include the planar mirror 83 and, if the planar mirror 83 is employed, the orientation of the optical axis for the radiation therefrom may be either perpendicular to the reference plane, parallel to the reference plane so as to propagate towards the light source 61, or parallel to the reference plane so as to propagage in a direction counter to the light source 61. In any case, the specific optical system may be of any suitable or desired structure depending on a particular application.

In general, since each of the liquid crystal panels has a relatively small height and a relatively large width, and when the case in which the direction of height of the respective liquid crystal panel is parallel to the reference plane and the case in which the direction of height of the respective liquid crystal panel is perpendicular to the reference plane are compared with each other, the former is effective to reduce the back focus of the primary lens group 79 and is therefore advantageous in accomplishing the correction of the aberrations of the projection lens assembly. In order to reduce the depth and the height of the projector as a whole while the former is employed, it is recommended that the optical axis of the first lens group of the projection lens assembly be perpendicular to the reference plane.

Even where no planar mirror is disposed within the projection lens assembly, in the environment in which 4×4 sets are arranged in each of a column and a row in a matrix, the apparatus as a whole may have a reduced depth as compared with a projection display utilizing a CRT. In such application, the depth of the apparatus as a whole can be reduced by disposing the planar mirror within the projection lens assembly 79. Also, if constructed as shown in FIG. 31, the apparatus can have a considerably reduced depth.

Figure 31:
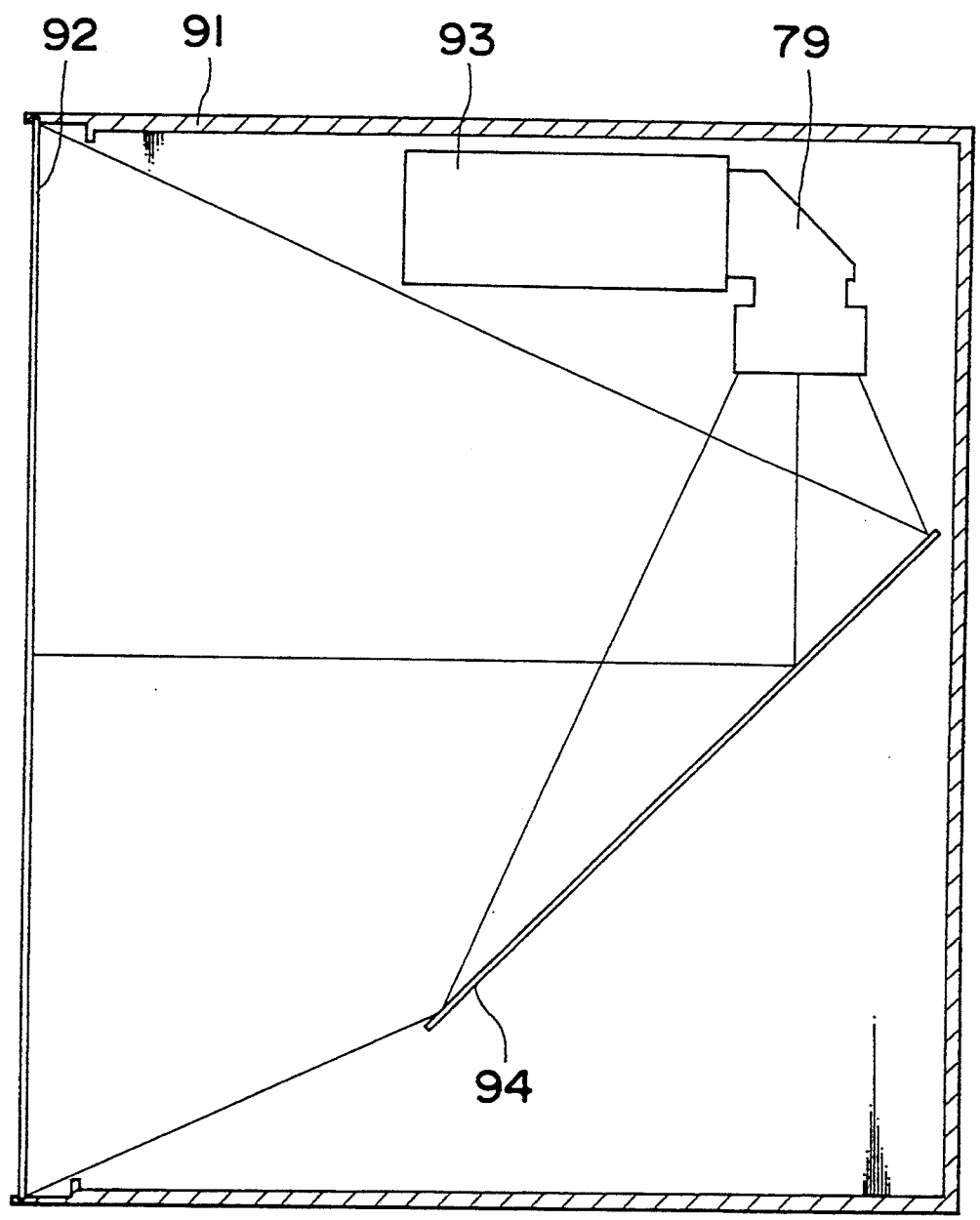
FIG. 31 is a schematic side sectional view of another embodiment of the projection display apparatus of the present invention.
Figure 32:
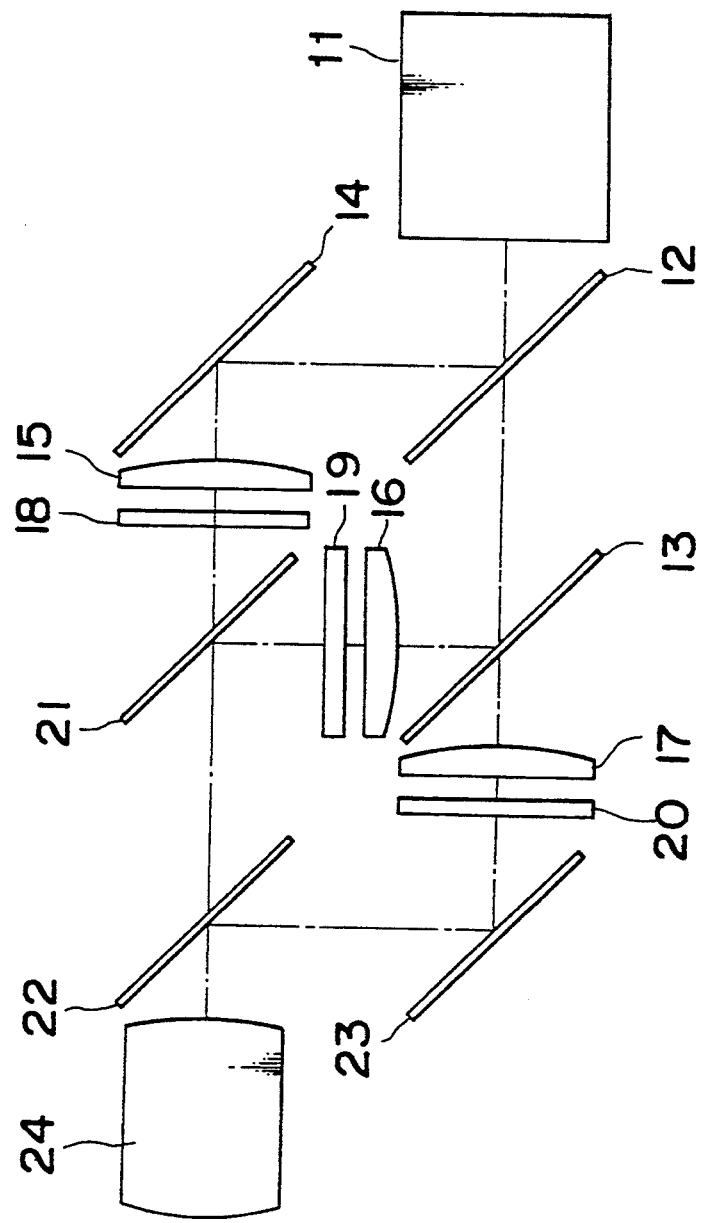
FIGS. 32 and 33 are schematic side and perspective views of optical systems of the prior art projectors, respectively.
Figure 33:
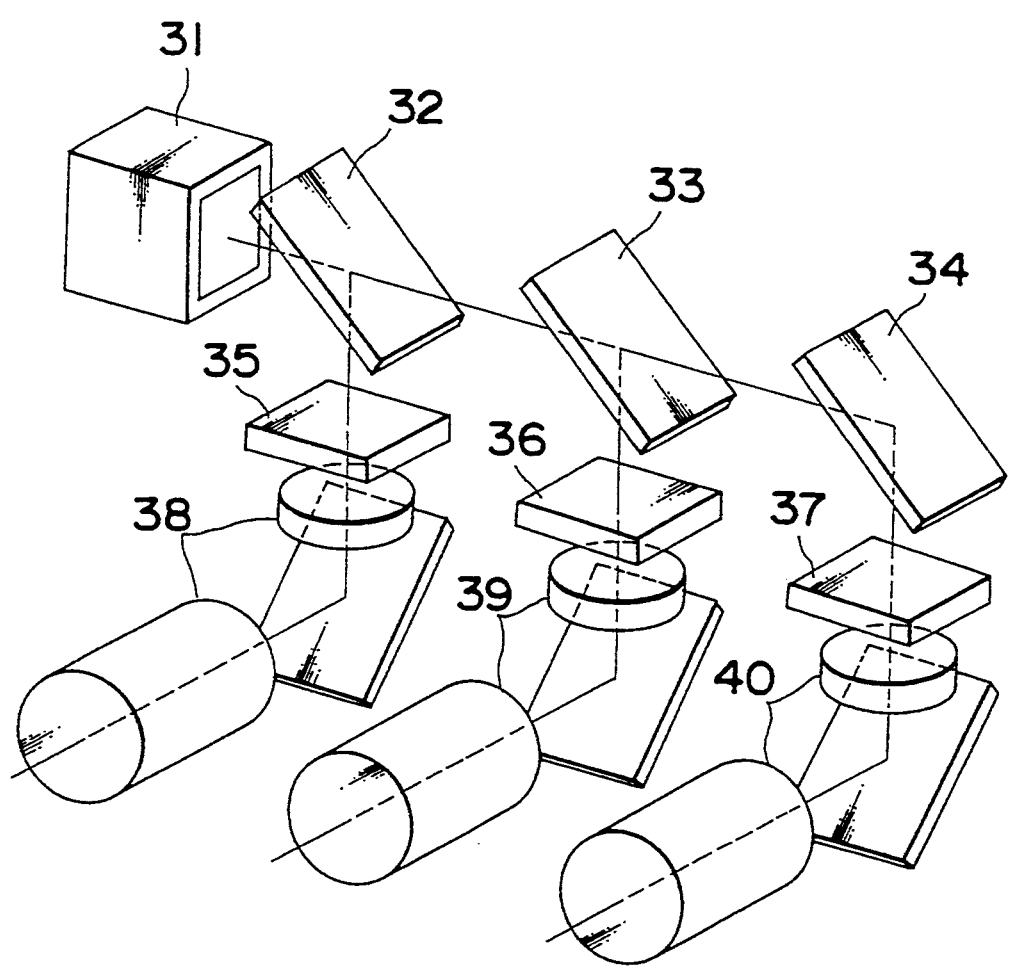
Figure 34:
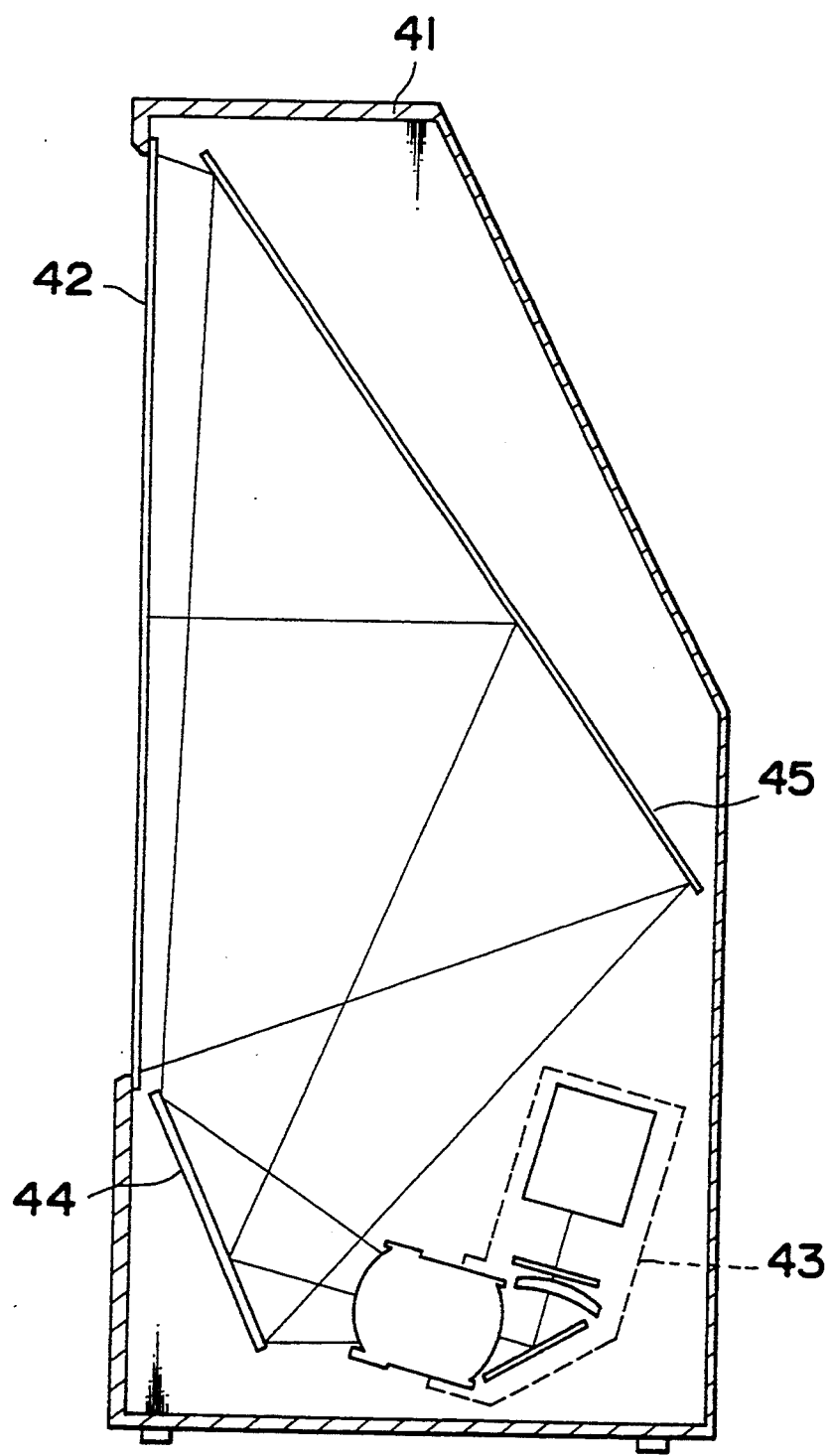
FIG. 34 is a schematic side sectional view of the prior art projection display apparatus.

FIG. 31 shows a horizontal cross section of the cabinet 91, in which a single planar mirror 94 is disposed on the path of travel of the light from the projection lens assembly 79 to the screen 92, with the projector 93 positioned at a right-hand or left-hand portion of the cabinet 91. The projector 93 shown therein may be of a construction shown in any one of FIGS. 30(b) and 30(d). The optical axis of the first lens group of the projector 93 is parallel to the horizontal direction of the screen 92, and the optical axis of the third lens group, that of the first lens group and that of the screen are configured to lie in a pattern generally similar to the shape of the letter "U". The direction of height of each of the liquid crystal panels is parallel to a plane containing the optical axis of the light source and that of the third lens group. Dimensions of each of the component parts in such case are as follows. The screen has an effective display size of 40 diagonal inches (having an aspect ratio of 4:3); each of the liquid crystal panels has an image size of 2.8 diagonal inches; the projection lens assembly has a focal length of about 60 mm; the distance of projection is 800 mm; the cabinet is 620 mm high, 825 mm wide and 720 mm deep.

Thus, according to the present invention, the wide-angle projection lens assembly has a back focus which is considerably large as compared with the focal length thereof and is effective to correct the aberrations. Also, such a projection lens assembly can be effectively used in the projection display apparatus of a rear projection type to provided a high quality picture on an enlarged scale in a compact cabinet.

Although the present invention has been described in connection with the preferred embodiments thereof with reference to the accompanying drawings, it is to be noted that various changes and modifications will be apparent to those skilled in the art. By way of example, although in describing any one of the foregoing embodiments of the present invention reference has been made to the use of the TFT liquid crystal display panels utilizing twisted nematic liquid crystal for the light valves, each of the light valves employable in the practice of the present invention may include any other type of liquid crystal panel, or a panel utilizing an electro-optical crystal, provided that it is of a light transmissive type capable of forming an optical image as a function of a change in optical characteristic.

Also, in the structure shown in FIG. 28, positive lenses may be disposed as the field lenses at respective positions adjacent the incident sides of the liquid crystal panels 73 to 75. Alternatively, in the structure shown in any one of FIGS. 27 and 28, the field lenses may be disposed between the dichroic mirror 67 and the dichroic mirror 68 and between the dichroic mirror 67 and the planar mirror 69, respectively. In either case, if the power of each of the field lenses is properly selected, the vignetting of the projected picture can be improved as compared with the ambient brightness.

Such changes and modifications are to be understood as included within the scope of the present invention as defined by the appended claims, unless they otherwise depart therefrom.

What is claimed is:

1. An optical system comprising: a screen; and a projection lens assembly which comprises a first lens group having a negative power, a second lens group having a negative power and a third lens group having a positive power, all arranged along the optical axis of the assembly in the foregoing order from one side of said screen, air space being left between the first and second lens groups and an air space being left between the second and third lens groups, each of said air spaces having a length along said optical axis greater than the entire thickness of the second lens group along said optical axis.

2. The optical system as claimed in claim 1, and further comprising a planar mirror disposed between the lens groups of one of the first and second lens groups and the second and third lens groups.

3. The optical system as claimed in claim 1, wherein the projection lens assembly satisfies the following conditions:

$$-2.0 < f_{G1}/f < -1.4$$

$$-15.0 < f_{G2}/f < -3.0$$

$$1.7 < (d_{G1} + d_{G2})/f < 2.2$$

wherein f represents the composite focal length of the entire assembly; $f_{G1}$ represents the composite focal length of the first lens group; $f_{G2}$ represents the composite focal length of the second lens group; $d_{G1}$ represents said length of the air space between the first and second lens groups; and $d_{G2}$ represents said length of the air space between the second and third lens groups.

4. The optical system as claimed in claim 1, wherein the first and third lens groups are fixed in position and the second lens group is movable in a direction parallel to the optical axis to effect focusing.

5. The optical system as claimed in claim 1, wherein said second lens group comprises lenses having respective positive and negative powers, said lens having a positive power having an Abbe number smaller than that of the lens having the negative power.

6. An optical system comprising: a screen; and a projection lens assembly which comprises a first lens group having a negative power, a second lens group having a negative power, a third lens group having a positive power, and a fourth lens group having a positive power, all arranged in along the optical axis of the assembly in the foregoing order from one side of said screen, said fourth lens group being disposed in the vicinity of a point at which the first, second and third lens groups focus light in a direction toward said side of the screen, an air space being left between the first and second lens groups and an air space being left between the second and third lens groups, each of said air spaces having a length along said optical axis greater than the entire thickness of the second lens group along said optical axis, principal rays of light which pass across a predetermined portion of the fourth lens group within a space in the projection lens assembly most remote from the screen being rendered parallel to an optical axis of the fourth lens group.

7. The optical system as claimed in claim 6, and further comprising a planar mirror disposed between the lens groups of one of the first and second lens groups and the second and third lens groups.

8. The optical system as claimed in claim 6, wherein the projection lens assembly satisfies the following conditions:

$$-2.6 < f_{G1}/f < -1.3$$

$$-9.0 < f_{G2}/f < -1.7$$

$$1.4 < (d_{G1} + d_{G2})/f < 2.3$$

wherein f represents the composite focal length of the entire assembly; $f_{G1}$ represents the composite focal length of the first lens group; $f_{G2}$ represents the composite focal length of the second lens group; $d_{G1}$ represents said length of the air space between the first and second lens groups; and $d_{G2}$ represents said length of the air space between the second and third lens groups.

9. The optical system as claimed in claim 6, wherein the projection lens assembly satisfies the following conditions:

$$-2.6 < f_{G1}/f < -1.3$$

$-9.0 < f_{G2}/f < -1.7$ $1.4 < (d_{G1} + d_{G2})/f < 2.3$ $0.9 < f_{G4}/d_{G3} < 1.5$ wherein f represents the composite focal length of the entire assembly; $f_{G1}$ represents the composite focal length of the first lens group; $f_{G2}$ represents the composite focal length of the second lens group; $f_{G4}$ represents the composite focal length of the fourth lens group; $d_{G1}$ represents said length of the air space between the first and second lens groups; $d_{G2}$ represents said length of the air space between the second and third lens groups and $d_{G4}$ represents the length of the air space between the third and fourth lens groups as taken along said optical axis of the projection lens assembly.

10. The optical system as claimed in claim 6, wherein the first, third and fourth lens groups are fixed in position and the second lens group is movable in a direction parallel to at least a portion of the optical axis of the assembly to effect focusing.

11. The optical system as claimed in claim 6, wherein said second lens group comprises lenses having respective positive and negative powers, said lens having a positive power having an Abbe number smaller than that of the lens having the negative power.

12. The optical system as claimed in claim 6, wherein the fourth lens group consists of a plano-convex lens having a flat surface oriented towards the screen.

13. The optical system as claimed in claim 6, wherein said fourth lens group consists of a plano-convex lens having a flat surface oriented towards the screen and a convex surface which is aspherical.

* * * * *